(12) United States Patent
Xu et al.

(10) Patent No.: US 10,135,655 B2
(45) Date of Patent: Nov. 20, 2018

(54) INDICATION INFORMATION TRANSMISSION METHOD AND APPARATUS

(71) Applicant: Huawei Technologies Co., Ltd., Shenzhen, Guangdong (CN)

(72) Inventors: Xiuqiang Xu, Shanghai (CN); Lei Wang, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/629,671

(22) Filed: Jun. 21, 2017

(65) Prior Publication Data

US 2017/0288928 A1    Oct. 5, 2017

Related U.S. Application Data

(63) Continuation of application No. PCT/CN2014/094540, filed on Dec. 22, 2014.

(51) Int. Cl.
| | |
|---|---|
| *H04L 27/26* | (2006.01) |
| *H04W 72/12* | (2009.01) |
| *H04W 76/27* | (2018.01) |
| *H04W 72/14* | (2009.01) |

(Continued)

(52) U.S. Cl.
CPC .......... *H04L 27/2627* (2013.01); *H04J 13/00* (2013.01); *H04J 13/0074* (2013.01); *H04L 5/0021* (2013.01); *H04L 5/0094* (2013.01); *H04L 27/2604* (2013.01); *H04L 27/2613* (2013.01); *H04W 72/12* (2013.01); *H04W 72/14* (2013.01); *H04W 76/27* (2018.02)

(58) Field of Classification Search
CPC .......... H04W 72/0413; H04W 72/042; H04W 72/1289; H04W 74/004; H04W 76/27
USPC ........................................................ 375/260
See application file for complete search history.

(56) References Cited

U.S. PATENT DOCUMENTS

| | | |
|---|---|---|
| 2007/0054624 A1 | 3/2007 | Kashiwagi |
| 2014/0029562 A1 | 1/2014 | Kishiyama |

(Continued)

FOREIGN PATENT DOCUMENTS

| | | |
|---|---|---|
| CN | 101541011 A | 9/2009 |
| CN | 101621490 A | 1/2010 |

(Continued)

OTHER PUBLICATIONS

Taherzadeh Mahmoud et al., "SCMA Codebook Design", 2014 IEEE 80th Vehicular Technology Conference (VTC2014-Fall), IEEE, Sep. 14, 2014, 6 pages.

(Continued)

*Primary Examiner* — Leila Malek

(57) ABSTRACT

The present disclosure discloses an indication information transmission method and apparatus. The method includes: determining a first signature sequence and a first modulation constellation that are used to transmit an uplink data stream by a terminal device; determining indication information that is used to indicate the first signature sequence and the first modulation constellation; and transmitting the indication information to the terminal device. In this way, a system network capacity can be effectively increased.

20 Claims, 8 Drawing Sheets

(51) Int. Cl.
*H04J 13/00* (2011.01)
*H04L 5/00* (2006.01)

(56) References Cited

U.S. PATENT DOCUMENTS

| | | | |
|---|---|---|---|
| 2014/0169412 A1* | 6/2014 | Baligh | H04B 1/709 375/150 |
| 2014/0254455 A1 | 9/2014 | Nikopour et al. | |
| 2016/0150544 A1* | 5/2016 | Nikopour | H04B 17/336 370/329 |

FOREIGN PATENT DOCUMENTS

| | | |
|---|---|---|
| CN | 101640940 A | 2/2010 |
| CN | 103368717 A | 10/2013 |
| CN | 104158631 A | 11/2014 |
| EP | 2247138 B1 | 7/2014 |
| WO | 2007029745 A1 | 3/2007 |
| WO | 2010102435 A1 | 9/2010 |

OTHER PUBLICATIONS van de Beek et al. "Multiple Access with Low-Density Signatures"; Global Telecommunications Conference 2009; Nov. 30-Dec. 4, 2009; Honolulu, Hawaii, USA; 6 pages.

Hoshyar et al.; "LDS-OFDM an Efficient Multiple Access Technique", 2010 IEEE 71st Vehicular Technology Conference, May 16-19, 2010; Taipei, Taiwan; 6 pages.

* cited by examiner

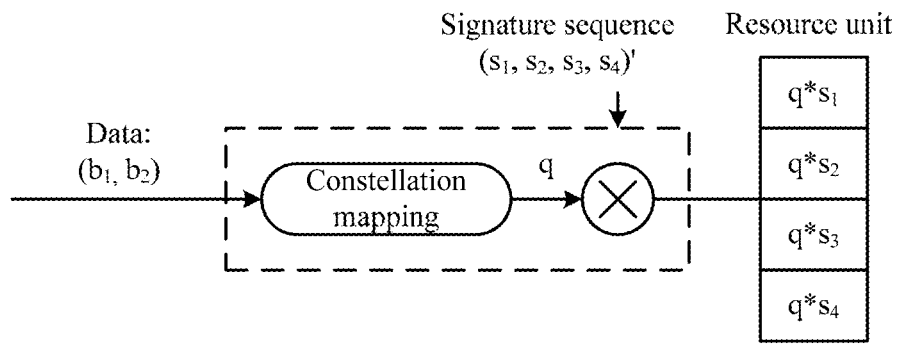

| Determine a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation | ~ S210 |

| Determine indication information that is used to indicate the first signature sequence and the first modulation constellation | ~ S220 |

| Transmit the indication information to the terminal device | ~ S230 |

FIG. 3

INDICATION INFORMATION TRANSMISSION METHOD AND APPARATUS

CROSS-REFERENCE TO RELATED APPLICATIONS

This application is a continuation of International Patent Application No. PCT/CN2014/094540, filed on Dec. 22, 2014, the disclosure of which is hereby incorporated by reference in its entirety.

TECHNICAL FIELD

The present application relates to the communications field, and in particular, to an indication information transmission method and apparatus in the communications field.

BACKGROUND

With constant evolution of a wireless cellular network, orthogonal multiple access technologies widely applied to the third-generation (3G) and the fourth-generation (4G) mobile communications systems, such as a Code Division Multiple Access (CDMA) technology and an orthogonal frequency division multiple access (OFDMA) technology, are gradually unable to meet people's ever-increasing capacity requirement for the cellular network, such as massive access and constant improvement of spectral efficiency. In addition, the study and application of a non-orthogonal multiple access technology has been gradually attracting more attentions from the industry and academia. People expect that a future wireless cellular network, for example, the fifth-generation (5G) mobile communications system, can effectively increase a capacity by using the non-orthogonal multiple access technology.

A low-density signature (LDS) technology is a typical non-orthogonal multiple access and transmission technology. Certainly, the LDS technology may have another name in the communications field. This technology is used to superpose M (where M is an integer not less than 1) data streams from one or more users onto N (where N is an integer not less than 1) subcarriers for transmission, where data of each data stream is spread on the N subcarriers by means of sparse spread spectrum. When a value of M is greater than that of N, this technology can effectively increase a network capacity, including a quantity of accessible users of a system and spectral efficiency. Therefore, as an important non-orthogonal multiple access technology, the LDS technology has drawn more attentions, and become an important candidate access technology for future wireless cellular network evolution.

In a non-orthogonal multiple access system such as an LDS system, when a terminal device transmits an uplink data stream by using the non-orthogonal multiple access technology, the terminal device needs to know data transmission information such as a modulation constellation that is used to transmit the uplink data stream. However, selection and allocation of the data transmission information is usually completed by a network device, and the terminal device does not directly participate in this process. Therefore, after the network device allocates data transmission information such as a modulation constellation for a to-be-transmitted data stream of the terminal device, how to notify the allocated data transmission information to the terminal device is a technical problem to be urgently resolved.

SUMMARY

In view of this, embodiments of the present disclosure provide an indication information transmission method and apparatus, to resolve a problem that a network device indicates data transmission information to a terminal device in a non-orthogonal multiple access system.

According to a first aspect, an indication information transmission method is provided, where the method includes: determining a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation; determining indication information that is used to indicate the first signature sequence and the first modulation constellation; and transmitting the indication information to the terminal device.

With reference to the first aspect, in a first possible implementation of the first aspect, the determining indication information that is used to indicate the first signature sequence and the first modulation constellation includes: determining that the first signature sequence belongs to a first signature matrix, where each signature matrix includes two or more signature sequences; and determining that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

With reference to the first aspect, in a second possible implementation of the first aspect, the determining indication information that is used to indicate the first signature sequence and the first modulation constellation includes: determining that the indication information includes second signature sequence information and first modulation constellation information, where the second signature sequence information is used to indicate a second signature sequence, and the first modulation constellation information is used to indicate the first modulation constellation.

With reference to the first or the second possible implementation of the first aspect, in a third possible implementation of the first aspect, the first modulation constellation information includes modulation order information of the first modulation constellation.

With reference to any one of the first aspect or the first to the third possible implementations of the first aspect, in a fourth possible implementation of the first aspect, the transmitting the indication information to the terminal device includes: transmitting an uplink scheduling grant message, dedicated higher-layer control signaling, or a system broadcast message to the terminal device, where the uplink scheduling grant message, the dedicated higher-layer control signaling, and the system broadcast message include the indication information.

With reference to the fourth possible implementation of the first aspect, in a fifth possible implementation of the first aspect, the dedicated higher-layer control signaling includes a radio resource control RRC connection setup message and an RRC connection reconfiguration message.

With reference to any one of the first aspect or the first to the fifth possible implementations of the first aspect, in a sixth possible implementation of the first aspect, the indication information is bit string information.

With reference to any one of the first aspect or the first to the sixth possible implementations of the first aspect, in a seventh possible implementation of the first aspect, the signature sequence is a low-density signature LDS sequence.

With reference to the seventh possible implementation of the first aspect, in an eighth possible implementation of the first aspect, a quantity of zero elements included in the signature sequence is greater than or equal to a quantity of non-zero elements.

According to a second aspect, an indication information transmission method is provided, where the method includes: receiving indication information transmitted by a network device, where the indication information is used to indicate a first signature sequence and a first modulation constellation that are used to transmit an uplink data stream, each signature sequence is a multi-dimensional complex-number vector including at least one zero element and at least one non-zero element, and the signature sequence is used to perform amplitude and phase adjustment on a modulation symbol obtained after a terminal device performs constellation mapping on the uplink data stream by using a modulation constellation; determining the first signature sequence and the first modulation constellation according to the indication information; and transmitting the uplink data stream according to the first signature sequence and the first modulation constellation.

With reference to the second aspect, in a first possible implementation of the second aspect, the indication information includes first signature matrix information, first signature sequence information, and first modulation constellation information, where the first signature matrix information is used to indicate a first signature matrix, the first signature sequence information is used to indicate the first signature sequence in the first signature matrix, and the first modulation constellation information is used to indicate the first modulation constellation; and the determining the first signature sequence and the first modulation constellation according to the indication information includes: determining the first signature sequence in the first signature matrix and the first modulation constellation according to the first signature matrix information, the first signature sequence information, and the first modulation constellation information, where each signature matrix includes two or more signature sequences.

With reference to the second aspect, in a second possible implementation of the second aspect, the indication information includes second signature sequence information and first modulation constellation information, where the second signature sequence information is used to indicate the first signature sequence, and the first modulation constellation information is used to indicate the first modulation constellation; and the determining the first signature sequence and the first modulation constellation according to the indication information includes: determining the first signature sequence and the first modulation constellation according to the second signature sequence information and the first modulation constellation information.

With reference to the first or the second possible implementation of the second aspect, in a third possible implementation of the second aspect, the first modulation constellation information includes modulation order information of the first modulation constellation.

With reference to any one of the second aspect or the first to the third possible implementations of the second aspect, in a fourth possible implementation of the second aspect, the receiving indication information transmitted by a network device includes: receiving, from the network device, an uplink scheduling grant message, dedicated higher-layer control signaling, or a system broadcast message, where the uplink scheduling grant message, the dedicated higher-layer control signaling, and the system broadcast message include the indication information.

With reference to the fourth possible implementation of the second aspect, in a fifth possible implementation of the second aspect, the dedicated higher-layer control signaling includes a radio resource control (RRC) connection setup message and an RRC connection reconfiguration message.

With reference to any one of the second aspect or the first to the fifth possible implementations of the second aspect, in a sixth possible implementation of the second aspect, the indication information is bit string information.

With reference to any one of the second aspect or the first to the sixth possible implementations of the second aspect, in a seventh possible implementation of the second aspect, the signature sequence is a low-density signature LDS sequence.

With reference to the seventh possible implementation of the second aspect, in an eighth possible implementation of the second aspect, a quantity of zero elements included in the signature sequence is greater than or equal to a quantity of non-zero elements.

According to a third aspect, an indication information transmission apparatus is provided, where the apparatus includes: a first determining module, configured to determine a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation; a second determining module, configured to determine indication information used to indicate the first signature sequence and a first modulation constellation that are determined by the first determining module; and a transmitting module, configured to transmit, to the terminal device, the indication information determined by the second determining module.

With reference to the third aspect, in a first possible implementation of the third aspect, the second determining module includes: a first determining unit, configured to determine that the first signature sequence belongs to a first signature matrix, where each signature matrix includes two or more signature sequences; and a second determining unit, configured to determine that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

With reference to the third aspect, in a second possible implementation of the third aspect, the second determining module includes a third determining unit, configured to determine that the indication information includes second signature sequence information and first modulation constellation information, where the second signature sequence information is used to indicate a second signature sequence, and the first modulation constellation information is used to indicate the first modulation constellation.

With reference to the first or the second possible implementation of the third aspect, in a third possible implementation of the third aspect, the first modulation constellation information determined by the second determining module includes modulation order information of the first modulation constellation.

With reference to any one of the third aspect or the first to the third possible implementations of the third aspect, in a fourth possible implementation of the third aspect, the transmitting module is specifically configured to transmit an uplink scheduling grant message, dedicated higher-layer control signaling, or a system broadcast message to the terminal device, where the uplink scheduling grant message, the dedicated higher-layer control signaling, and the system broadcast message include the indication information.

With reference to the fourth possible implementation of the third aspect, in a fifth possible implementation of the third aspect, the dedicated higher-layer control signaling includes a radio resource control RRC connection setup message and an RRC connection reconfiguration message.

With reference to any one of the third aspect or the first to the fifth possible implementations of the third aspect, in a sixth possible implementation of the third aspect, the indication information determined by the second determining module is bit string information.

With reference to any one of the third aspect or the first to the sixth possible implementations of the third aspect, in a seventh possible implementation of the third aspect, the signature sequence is a low-density signature LDS sequence.

With reference to the seventh possible implementation of the third aspect, in an eighth possible implementation of the third aspect, a quantity of zero elements included in the signature sequence is greater than or equal to a quantity of non-zero elements.

With reference to any one of the third aspect or the first to the eighth possible implementations of the third aspect, in a ninth possible implementation of the third aspect, the apparatus is a network device.

According to a fourth aspect, an indication information transmission apparatus is provided, where the apparatus includes: a receiving module, configured to receive indication information transmitted by a network device, where the indication information is used to indicate a first signature sequence and a first modulation constellation that are used to transmit an uplink data stream, each signature sequence is a multi-dimensional complex-number vector including at least one zero element and at least one non-zero element, and the signature sequence is used to perform amplitude and phase adjustment on a modulation symbol obtained after a terminal device performs constellation mapping on the uplink data stream by using a modulation constellation; a determining module, configured to determine the first signature sequence and the first modulation constellation according to the indication information received by the receiving module; and a transmitting module, configured to transmit the uplink data stream according to the first signature sequence and the first modulation constellation that are determined by the determining module.

With reference to the fourth aspect, in a first possible implementation of the fourth aspect, the indication information received by the receiving module includes first signature matrix information, first signature sequence information, and first modulation constellation information, where the first signature matrix information is used to indicate a first signature matrix, the first signature sequence information is used to indicate the first signature sequence in the first signature matrix, and the first modulation constellation information is used to indicate the first modulation constellation; and the determining module includes a first determining unit, configured to determine the first signature sequence in the first signature matrix and the first modulation constellation according to the first signature matrix information, the first signature sequence information, and the first modulation constellation information, where each signature matrix includes two or more signature sequences.

With reference to the fourth aspect, in a second possible implementation of the fourth aspect, the indication information received by the receiving module includes second signature sequence information and first modulation constellation information, where the second signature sequence information is used to indicate the first signature sequence, and the first modulation constellation information is used to indicate the first modulation constellation; and the determining module includes a second determining unit, configured to determine the first signature sequence and the first modulation constellation according to the second signature sequence information and the first modulation constellation information.

With reference to the first or the second possible implementation of the fourth aspect, in a third possible implementation of the fourth aspect, the first modulation constellation information received by the receiving module includes modulation order information of the first modulation constellation.

With reference to any one of the fourth aspect or the first to the third possible implementations of the fourth aspect, in a fourth possible implementation of the fourth aspect, the receiving module is specifically configured to receive, from the network device, an uplink scheduling grant message, dedicated higher-layer control signaling, or a system broadcast message, where the uplink scheduling grant message, the dedicated higher-layer control signaling, and the system broadcast message include the indication information.

With reference to the fourth possible implementation of the fourth aspect, in a fifth possible implementation of the fourth aspect, the dedicated higher-layer control signaling includes a radio resource control RRC connection setup message and an RRC connection reconfiguration message.

With reference to any one of the fourth aspect or the first to the fifth possible implementations of the fourth aspect, in a sixth possible implementation of the fourth aspect, the indication information received by the receiving module is bit string information.

With reference to any one of the fourth aspect or the first to the sixth possible implementations of the fourth aspect, in a seventh possible implementation of the fourth aspect, the signature sequence is a low-density signature LDS sequence.

With reference to the seventh possible implementation of the fourth aspect, in an eighth possible implementation of the fourth aspect, a quantity of zero elements included in the signature sequence is greater than or equal to a quantity of non-zero elements.

With reference to any one of the fourth aspect or the first to the eighth possible implementations of the fourth aspect, in a ninth possible implementation of the fourth aspect, the apparatus is a terminal device.

According to a fifth aspect, an indication information transmission apparatus is provided, where the apparatus includes a processor, a memory, a bus system, and a transmitter, where the processor, the memory, and the transmitter are connected by using the bus system, the memory is configured to store an instruction, and the processor is configured to execute the instruction stored in the memory, to control the transmitter to transmit a signal; the processor is configured to: determine a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation; and determine indication information that is used to indicate the first signature sequence and the first modulation constellation; and the transmitter is configured to transmit the indication information to the terminal device.

With reference to the fifth aspect, in a first possible implementation of the fifth aspect, that the processor determines the indication information that is used to indicate the first signature sequence and the first modulation constellation includes: determining that the first signature sequence belongs to a first signature matrix, where each signature matrix includes two or more signature sequences; and determining that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

With reference to the fifth aspect, in a second possible implementation of the fifth aspect, that the processor determines the indication information that is used to indicate the first signature sequence and the first modulation constellation includes: determining that the indication information includes second signature sequence information and first modulation constellation information, where the second signature sequence information is used to indicate a second signature sequence, and the first modulation constellation information is used to indicate the first modulation constellation.

With reference to the first or the second possible implementation of the fifth aspect, in a third possible implementation of the fifth aspect, the first modulation constellation information determined by the processor includes modulation order information of the first modulation constellation.

With reference to any one of the fifth aspect or the first to the third possible implementations of the fifth aspect, in a fourth possible implementation of the fifth aspect, that the transmitter transmits the indication information to the terminal device includes: transmitting an uplink scheduling grant message, dedicated higher-layer control signaling, or a system broadcast message to the terminal device, where the uplink scheduling grant message, the dedicated higher-layer control signaling, and the system broadcast message include the indication information.

With reference to the fourth possible implementation of the fifth aspect, in a fifth possible implementation of the fifth aspect, the dedicated higher-layer control signaling includes a radio resource control RRC connection setup message and an RRC connection reconfiguration message.

With reference to any one of the fifth aspect or the first to the fifth possible implementations of the fifth aspect, in a sixth possible implementation of the fifth aspect, the indication information determined by the processor is bit string information.

With reference to any one of the fifth aspect or the first to the sixth possible implementations of the fifth aspect, in a seventh possible implementation of the fifth aspect, the signature sequence is a low-density signature LDS sequence.

With reference to the seventh possible implementation of the fifth aspect, in an eighth possible implementation of the fifth aspect, a quantity of zero elements included in the signature sequence is greater than or equal to a quantity of non-zero elements.

With reference to any one of the fifth aspect or the first to the eighth possible implementations of the fifth aspect, in a ninth possible implementation of the fifth aspect, the apparatus is a network device.

According to a sixth aspect, an indication information transmission apparatus is provided, where the apparatus includes a processor, a memory, a bus system, a receiver, and a transmitter, where the processor, the memory, the receiver, and the transmitter are connected by using the bus system, the memory is configured to store an instruction, and the processor is configured to execute the instruction stored in the memory, to control the receiver to receive a signal and to control the transmitter to transmit a signal; the receiver is configured to receive indication information transmitted by a network device, where the indication information is used to indicate a first signature sequence and a first modulation constellation that are used to transmit an uplink data stream, each signature sequence is a multi-dimensional complex-number vector including at least one zero element and at least one non-zero element, and the signature sequence is used to perform amplitude and phase adjustment on a modulation symbol obtained after a terminal device performs constellation mapping on the uplink data stream by using a modulation constellation; the processor is configured to determine the first signature sequence and the first modulation constellation according to the indication information; and the transmitter is configured to transmit the uplink data stream according to the first signature sequence and the first modulation constellation.

With reference to the sixth aspect, in a first possible implementation of the sixth aspect, the indication information received by the receiver includes first signature matrix information, first signature sequence information, and first modulation constellation information, where the first signature matrix information is used to indicate a first signature matrix, the first signature sequence information is used to indicate the first signature sequence in the first signature matrix, and the first modulation constellation information is used to indicate the first modulation constellation; and that the processor determines the first signature sequence and the first modulation constellation according to the indication information includes: determining the first signature sequence in the first signature matrix and the first modulation constellation according to the first signature matrix information, the first signature sequence information, and the first modulation constellation information, where each signature matrix includes two or more signature sequences.

With reference to the sixth aspect, in a second possible implementation of the sixth aspect, the indication information received by the receiver includes second signature sequence information and first modulation constellation information, where the second signature sequence information is used to indicate the first signature sequence, and the first modulation constellation information is used to indicate the first modulation constellation; and that the processor determines the first signature sequence and the first modulation constellation according to the indication information includes: determining the first signature sequence and the first modulation constellation according to the second signature sequence information and the first modulation constellation information.

With reference to the first or the second possible implementation of the sixth aspect, in a third possible implementation of the sixth aspect, the first modulation constellation information determined by the processor includes modulation order information of the first modulation constellation.

With reference to any one of the sixth aspect or the first to the third possible implementations of the sixth aspect, in a fourth possible implementation of the sixth aspect, that the receiver receives the indication information transmitted by the network device includes: receiving, from the network device, an uplink scheduling grant message, dedicated higher-layer control signaling, or a system broadcast message, where the uplink scheduling grant message, the dedicated higher-layer control signaling, and the system broadcast message include the indication information.

With reference to the fourth possible implementation of the sixth aspect, in a fifth possible implementation of the sixth aspect, the dedicated higher-layer control signaling includes a radio resource control RRC connection setup message and an RRC connection reconfiguration message.

With reference to any one of the sixth aspect or the first to the fifth possible implementations of the sixth aspect, in a sixth possible implementation of the sixth aspect, the indication information received by the receiver is bit string information.

With reference to any one of the sixth aspect or the first to the sixth possible implementations of the sixth aspect, in a seventh possible implementation of the sixth aspect, the signature sequence is a low-density signature LDS sequence.

With reference to the seventh possible implementation of the sixth aspect, in an eighth possible implementation of the sixth aspect, a quantity of zero elements included in the signature sequence is greater than or equal to a quantity of non-zero elements.

With reference to any one of the sixth aspect or the first to the eighth possible implementations of the sixth aspect, in a ninth possible implementation of the sixth aspect, the apparatus is a terminal device.

Based on the foregoing technical solutions, according to the indication information transmission method and apparatus in the embodiments of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 2a and FIG. 2b are schematic diagrams of an encoding principle of a non-orthogonal multiple access system;

FIG. 3 is a schematic flowchart of an indication information transmission method according to an embodiment of the present disclosure;

DESCRIPTION OF EMBODIMENTS

Figure 1:
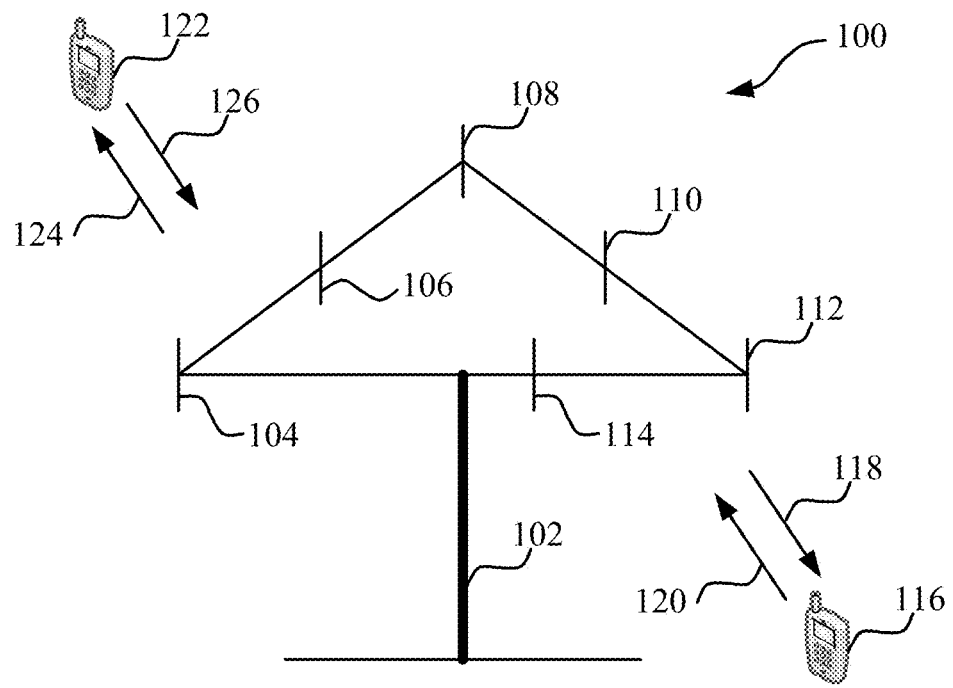
FIG. 1 is a schematic architecture diagram of a communications system applied to an embodiment of the present disclosure.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions in the embodiments of the present disclosure may be applied to various communications systems based on a non-orthogonal multiple access technology, such as an LDS system. Certainly, the LDS may have another name in the communications field. Further, the technical solutions in the embodiments of the present disclosure may be applied to a multicarrier transmission system based on the non-orthogonal multiple access technology, such as an orthogonal frequency division multiplexing (OFDM) system, a filter bank multicarrier (FBMC) system, a Generalized Frequency Division Multiplexing (GFDM) system, and a filtered orthogonal frequency division multiplexing (F-OFDM) system that are based on the non-orthogonal multiple access technology. It should be further understood that the embodiments of the present disclosure merely use an example of a communications system using the LDS technology for description. However, the embodiments of the present disclosure are not limited thereto.

It should be further understood that, in the embodiments of the present disclosure, a terminal device may communicate with one or more core networks by using a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network.

It should be further understood that, in the embodiments of the present disclosure, a network device may be configured to communicate with the terminal device. The network device may be a base station (BTS) in a global system for mobile communications (GSM) system or a Code Division Multiple Access (CDMA) system, or may be a NodeB (NB) in a Wideband Code Division Multiple Access (WCDMA) system, or may be an evolved NodeB (eNB or eNodeB) in a Long Term Evolution (LTE) system. Alternatively, the network device may be a relay station, an access point, a vehicle-mounted device, a wearable device, or a base station device in a future 5G network.

FIG. 1 is a schematic architecture diagram of a communications system applied to an embodiment of the present disclosure. As shown in FIG. 1, the communications system 100 may include a network device 102. The network device 102 may include one or more antenna sets, and each antenna set may include one or more antennas. For example, one antenna set may include antennas 104 and 106, another antenna set may include antennas 108 and 110, and an additional set may include antennas 112 and 114. Although two antennas are shown in each antenna set in FIG. 1, it should be understood that each antenna set may have more or less antennas. The network device 102 may additionally include a transmitter chain and a receiver chain. A person of ordinary skill in the art may understand that both the transmitter chain and the receiver chain may include multiple components (such as a processor, a modulator, a multiplexer, a demodulator, a demultiplexer, or an antenna) related to signal transmitting and signal receiving.

The network device 102 may communicate with multiple terminal devices (such as a terminal device 116 and a terminal device 122). However, it may be understood that the network device 102 may communicate with any quantity of terminal devices similar to the terminal device 116 or the terminal device 122. The terminal devices 116 and 122 may be, for example, cellular phones, smartphones, portable computers, handheld communications devices, handheld computing devices, satellite radio apparatuses, global positioning systems, PDAs, and/or any other appropriate devices configured to perform communication in the wireless communications system 100.

As shown in FIG. 1, the terminal device 116 communicates with the antennas 112 and 114. The antennas 112 and 114 transmit information to the terminal device 116 by using a forward link 118, and receive information from the terminal device 116 by using a reverse link 120. In addition, the terminal device 122 communicates with the antennas 104 and 106. The antennas 104 and 106 transmit information to the terminal device 122 by using a forward link 124, and receive information from the terminal device 122 by using a reverse link 126.

For example, in a frequency division duplex (FDD) system, the forward link 118 may use a frequency band different from that of the reverse link 120, and the forward link 124 may use a frequency band different from that of the reverse link 126. For another example, in a time division duplex (TDD) system and a full duplex system, the forward link 118 and the reverse link 120 may use a same frequency band, and the forward link 124 and the reverse link 126 may use a same frequency band.

Each antenna set and/or area designed for communication is referred to as a sector of the network device 102. For example, the antenna set may be designed to communicate with a terminal device in a sector of coverage of the network device 102. In a process in which the network device 102 communicates with the terminal devices 116 and 122 by using the forward links 118 and 124 respectively, a transmit antenna of the network device 102 may increase a signal-to-noise ratio of the forward links 118 and 124 by means of beamforming. In addition, compared with a manner in which a network device transmits a signal to all terminal devices of the network device by using a single antenna, when the network device 102 transmits, by means of beamforming, a signal to the terminal devices 116 and 122 that are randomly situated in related coverage, a mobile device in a neighboring cell receives relatively little interference.

In a given time, the network device 102, and the terminal device 116 or the terminal device 122 may be a wireless communications transmitting apparatus and/or a wireless communications receiving apparatus. When transmitting data, the wireless communications transmitting apparatus may encode data for transmission. Specifically, the wireless communications transmitting apparatus may obtain (for example, generate, receive from another communications apparatus, or store in a memory) a particular quantity of data bits to be transmitted to the wireless communications receiving apparatus by using a channel. Such data bits may be included in a transport block (or multiple transport blocks) of data, and the transport block may be segmented to generate multiple code blocks.

It should be understood that the communications system is a non-orthogonal multiple access system. For example, the system is an LDS system, the network device is, for example, a base station, and the terminal device is, for example, user equipment. The embodiments of the present disclosure merely use the LDS system, the base station, and the user equipment as examples for description. However, the embodiments of the present disclosure are not limited thereto.

FIG. 1 shows the communications system applied to the embodiments of the present disclosure. The communications system is, for example, the LDS system. The following briefly describes an encoding principle at a transmit end of a non-orthogonal multiple access system such as the LDS system with reference to FIG. 2a and FIG. 2b.

Figure 2A:
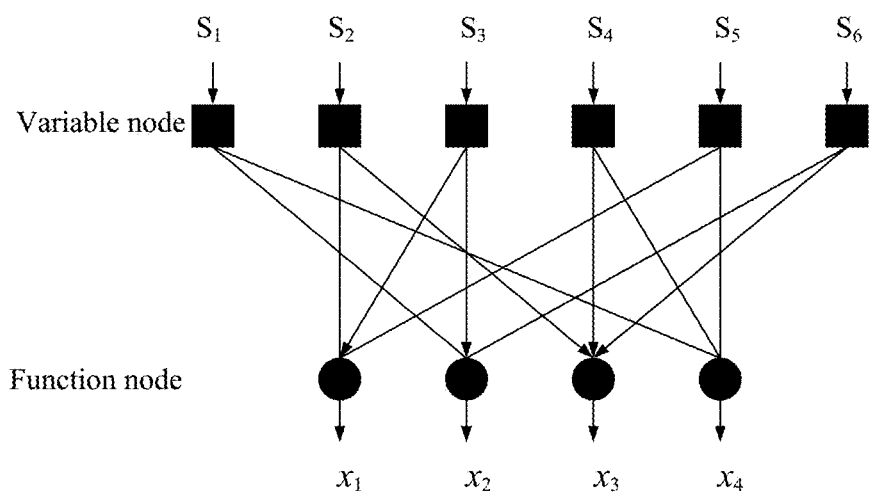

As shown in FIG. 2a, for example, six data streams reuse four resource units, that is, M=6 and N=4, where M is a positive integer, representing a quantity of data streams; and N is a positive integer, representing a quantity of resource units. A resource unit may be a subcarrier, or a resource element (RE), or an antenna port. The six data streams constitute one group, and the four resource units constitute one encoding unit.

In the bipartite graph shown in FIG. 2a, a connection line between a data stream and a resource unit indicates at least one data combination of the data stream, and a non-zero modulation symbol is transmitted on the resource unit after the data combination has undergone constellation mapping and amplitude and phase adjustment. If there is no connection line between a data stream and a resource unit, it indicates that all modulation symbols transmitted on the resource unit after all possible data combinations of the data stream have undergone constellation mapping and amplitude and phase adjustment are zero modulation symbols. A data combination of data streams may be understood according to the following description. For example, in a binary bit data stream, 00, 01, 10, and 11 are all possible data combinations of two-bit data. For convenience of description, s1 to s6 represent to-be-transmitted data combinations of the six data streams in the bipartite graph, and x1 to x4 represent modulation symbols that are transmitted on the four resource units in the bipartite graph.

It may be learned from the bipartite graph that modulation symbols are transmitted on two or more resource units after data combinations of data streams have undergone constellation mapping and amplitude and phase adjustment. In addition, the modulation symbol transmitted on each resource unit is superposition of modulation symbols after data combinations of two or more data streams have undergone respective constellation mapping and amplitude and phase adjustment. For example, non-zero modulation symbols may be transmitted on resource unit 1 and resource unit 2 after a to-be-transmitted data combination s3 of data stream 3 has undergone constellation mapping and amplitude and phase adjustment. A modulation symbol x3 transmitted on resource unit 3 is superposition of non-zero modulation symbols that are obtained after to-be-transmitted data combinations s2, s4, and s6 of data stream 2, data stream 4, and data stream 6 have undergone respective constellation mapping and amplitude and phase adjustment. A quantity of data streams may be greater than a quantity of resource units. Therefore, the non-orthogonal multiple access system can effectively increase a network capacity, including a quantity of users that can be connected, spectral efficiency, and the like.

Further, as shown in FIG. 2b, a modulation symbol obtained after data (b1, b2) of a data stream has undergone constellation mapping is q. After phase and amplitude adjustment is performed on the modulation symbol q by using elements in a signature sequence, that is, adjustment factors, modulation symbols transmitted on resource units are obtained, where the modulation symbols are $q*s_1$, $q*s_2$, $q*s_3$, and $q*s_4$, respectively.

The foregoing describes an application scenario of the embodiments of the present disclosure and the encoding principle with reference to FIG. 1, FIG. 2a, and FIG. 2b. The following describes an indication information transmission method in an embodiment of the present disclosure from a perspective of a network device side with reference to FIG. 3 and FIG. 4.

FIG. 3 shows an indication information transmission method 200 according to an embodiment of the present disclosure. The method 200 may be executed by, for example, a network device in a non-orthogonal multiple access system, and the network device is, for example, a base station. As shown in FIG. 3, the method 200 includes the following steps:

S210. Determine determining a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation.

S220. Determine indication information that is used to indicate the first signature sequence and the first modulation constellation.

S230. Transmit the indication information to the terminal device.

Specifically, in the non-orthogonal multiple access system such as an LDS system, the network device allocates or specifies a signature sequence and a modulation constellation to or for a to-be-transmitted uplink data stream of the terminal device. To make the terminal device learn the signature sequence and the first modulation constellation that have been allocated by the network device, the network device may determine indication information, and transmit the indication information to the terminal device. The indication information is used to indicate the signature sequence and the modulation constellation that are used to transmit the uplink data stream by the terminal device. After receiving the indication information transmitted by the network device, the terminal device may determine the signature sequence and the modulation constellation used to transmit the uplink data stream, and may transmit the uplink data stream according to the signature sequence and the modulation constellation. Therefore, the network device and the terminal device exchange information, so that the terminal device can determine the signature sequence and the modulation constellation that are allocated by the network device, and the non-orthogonal multiple access system can normally run.

Therefore, according to the indication information transmission method in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

In this embodiment of the present disclosure, in a non-orthogonal multiple access technology such as an LDS technology, a signature sequence is used to transmit multiple different data streams on a same resource unit. That is, the multiple different data streams reuse a same resource unit. Data streams may use different signature sequences, so that resource utilization is improved. The data streams may come from a same terminal device or from different terminal devices.

The signature sequence may be represented as a multi-dimensional complex-number vector. The complex-number vector may have two or more dimensions. The signature sequence may include at least one zero element and at least one non-zero element. Each dimension of the complex-number vector of the signature sequence may represent a resource unit. A corresponding element may be understood as an adjustment factor, and is used to perform amplitude and phase adjustment on a modulation symbol obtained after data of a data stream has undergone constellation mapping. For example, the adjustment method may be that the modulation symbol obtained after the data of the data stream has undergone constellation mapping is multiplied by the adjustment factor. The modulation symbol on which adjustment is performed by using multiple adjustment factors is transmitted on corresponding resource units, so that data is extensively transmitted on multiple resource units. The data may be binary bit data or multivariate data. The resource unit may be a resource unit in a time domain, a frequency domain, a space domain, a time-frequency domain, a time-space domain, or a time-frequency-space domain.

With reference to the foregoing descriptions, an encoding principle of the non-orthogonal multiple access technology may be exemplarily illustrated by using FIG. 2b. In the example shown in FIG. 2b, the signature sequence may be represented as:

$$\begin{pmatrix} s_1 \\ s_2 \\ s_3 \\ s_4 \end{pmatrix}.$$

There are four dimensions in a multi-dimensional complex-number vector represented by the signature sequence, representing four resource units. In addition, in the four elements of the signature sequence, there is at least one group of i and j, where $1 \le i \ne j \le 4$, so that $s_i=0$ and $s_j \ne 0$. A modulation symbol obtained after data (b1, b2) of a data stream has undergone constellation mapping is q. After phase and amplitude adjustment is performed on q by using elements in the signature sequence, that is, adjustment factors, modulation symbols transmitted on resource units are obtained, where the modulation symbols are $q^*s_1$, $q^*s_2$, $q^*s_3$, and $q^*s_4$, respectively.

More generally, the signature sequence may be represented in the following form:

$$\begin{pmatrix} s_{1,m} \\ s_{2,m} \\ \vdots \\ s_{N,m} \end{pmatrix}, 1 \le m \le M,$$

where $s_{n,m}$ represents an element in the signature sequence; m and n are natural numbers; $1 \le n \le N$, $1 \le m \le M$; N represent N resource units in an encoding unit; M represents a quantity of data streams reused in a group; $s_{n,m}=\alpha^*\exp(j^*\beta)$, $1 \le n \le N$, $1 \le m \le M$; $\alpha$ and $\beta$ may be any real numbers; M and N are integers greater than 1; there is at least one group of i and j; and s so that $1 \le i \ne j \le N$, so that $s_{i,m}=0$ and $s_{j,m} \ne 0$.

In the non-orthogonal multiple access system, M signature sequences may constitute a signature matrix. The signature matrix may be, for example, in the following form:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

Therefore, in this embodiment of the present disclosure, the signature matrix includes one or more signature sequences. The signature sequence is a multi-dimensional complex-number vector including at least one zero element and at least one non-zero element. The signature sequence is used to perform amplitude and phase adjustment on a modulation symbol that is obtained after the terminal device or the network device performs constellation mapping on a data stream by using a modulation constellation.

It should be further understood that, when this embodiment of the present disclosure is applied, it further needs to assume that the network device and the terminal device in the non-orthogonal multiple access system both store some or all of the following pre-designed content:

(1) One or more signature matrices:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M},$$

where $s_{n,m}=\alpha^*\exp(j^*\beta)$, $1 \le n \le N$, $1 \le m \le M$, $\alpha$ and $\beta$ may be any real numbers; M and N both are integers greater than 1; in addition, for each m, $1 \le m \le M$; there is at least one group of $i_m$ and $j_n$; and $1 \le i_m \ne j_m \le M$, so that $s_{i_m,m}=0$ and $s_{j_m,m} \ne 0$;

(2) One or more signature sequences:

$$\begin{pmatrix} s_{1,m} \\ s_{2,m} \\ \vdots \\ s_{N,m} \end{pmatrix},$$

where $1 \le m \le M$; and (3) One or more modulation constellations: $\{q_1, q_2, \ldots, q_{Q_m}\}$, where $Q_m \ge 2$ and each modulation constellation is corresponding to a modulation order.

Figure 4:
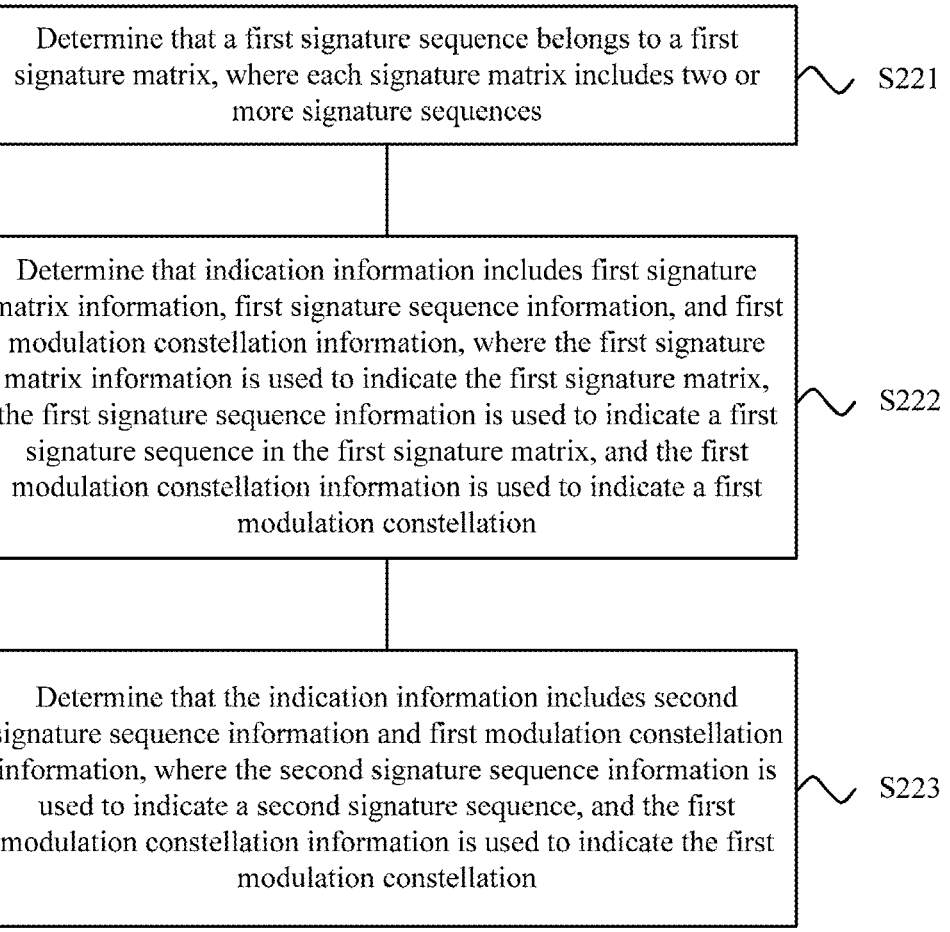
FIG. 4 is a schematic flowchart of a method for determining indication information according to an embodiment of the present disclosure.

With reference to FIG. 4, the following details the method 220 for determining indication information according to this embodiment of the present disclosure.

As shown in FIG. 4, in this embodiment of the present disclosure, optionally, the determining indication information that is used to indicate the first signature sequence and the first modulation constellation includes:

S221. Determine that the first signature sequence belongs to a first signature matrix, where each signature matrix includes two or more signature sequences.

S222. Determine that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

Specifically, in this embodiment of the present disclosure, the network device and the terminal device may store a signature matrix, a signature sequence, and a modulation constellation that are pre-designed. Alternatively, the network device and the terminal device may store a signature matrix and a modulation constellation that are pre-designed. A column of the signature matrix is a signature sequence. Therefore, in this embodiment of the present disclosure, storing the signature matrix also means storing a corresponding signature sequence.

In this embodiment of the present disclosure, the network device allocates or specifies a signature sequence and a modulation constellation that are used to transmit an uplink data stream by the terminal device. The network device may determine that the signature sequence is the first signature sequence in the first signature matrix, and the network device may determine that the modulation constellation is the first modulation constellation. Therefore, the network device may determine, according to the first signature sequence and the first modulation constellation, that the indication information includes the first signature matrix information, the first signature sequence information, and the first modulation constellation information. For example, the indication information may include three logical information segments. Logical information segment 1 may carry the first signature matrix information, used to indicate the first signature matrix included in the indication information. Logical information segment 2 may carry the first signature sequence information, used to indicate the first signature sequence in the first signature matrix. Logical information segment 3 may carry the first modulation constellation information, used to indicate the first modulation constellation included in the indication information.

It should be understood that in this embodiment of the present disclosure, the logical information segments of the indication information may be consecutively or non-consecutively present in any sequential order in an instruction in which the indication information is located. This embodiment of the present disclosure sets no limit thereon.

Correspondingly, after receiving an instruction or a message that carries the indication information, for example, the terminal device may learn, according to logical information segment 1, which signature matrix is used to transmit a to-be-transmitted uplink data stream; may learn, according to logical information segment 2, which signature sequence in the signature matrix indicated by logical information segment 1 is used to transmit the to-be-transmitted uplink data stream; and may learn, according to logical information segment 3, which modulation order or which modulation constellation is used to transmit the to-be-transmitted uplink data stream. Therefore, the terminal device can transmit the uplink data stream according to a signature sequence and a modulation constellation that are finally determined. That is, the terminal device can perform constellation mapping on the uplink data stream, and perform amplitude and phase adjustment on a modulation symbol obtained by means of constellation mapping. In this way, the non-orthogonal multiple access system can normally run, and a system network capacity can be effectively increased.

In this embodiment of the present disclosure, each modulation constellation may be corresponding to a modulation order. Therefore, logical information segment 3 may further indicate, in a manner of indicating a modulation order, a modulation constellation used to transmit the to-be-transmitted uplink data stream by the terminal device. Correspondingly, the terminal device may learn, according to logical information segment 3, the modulation order corresponding to the to-be-transmitted uplink data stream, so as to determine the modulation constellation corresponding to the modulation order in a one-to-one manner, and transmit the uplink data stream.

That is, in this embodiment of the present disclosure, optionally, the first modulation constellation information includes modulation order information of the first modulation constellation.

It should be understood that, in this embodiment of the present disclosure, if the logical information segments indicate index values, the network device side and the terminal device side need to pre-establish consistent index relationships between related information, such as an index relationship between a signature matrix index value and a signature matrix, an index relationship between a signature sequence index value and a signature sequence in each signature matrix, and an index relationship between an modulation constellation index value and each modulation constellation, so that the network device and the terminal device can uniquely determine a corresponding signature matrix, signature sequence, and modulation constellation according to the index values indicated by the logical information segments and according to the pre-established related index relationships.

It should be further understood that, in this embodiment of the present disclosure, the network device and the terminal device may use multiple methods to pre-store a signature matrix. A simple and direct method is storing all included zero elements and non-zero elements in a manner described above:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

This embodiment of the present disclosure merely uses the example to describe storage of the signature matrix. However, it should be understood that this embodiment of the present disclosure is not limited thereto, and the network device and the terminal device may use another method to pre-store the signature matrix.

It should be further understood that this embodiment of the present disclosure merely uses the foregoing solution as an example for description. However, the present disclosure is not limited thereto. For example, when signature sequences that are used to transmit uplink data by the terminal device and that are determined by the network device all belong to a same signature matrix or when a same signature matrix is used by default, the indication information may include only the first signature sequence information and the first modulation constellation information. For another example, when signature sequences that are used to transmit uplink data by the terminal device and that are determined by the network device all are signature sequences with fixed serial numbers by default, the indication information may include only the first signature matrix information and the first modulation constellation information. For another example, when modulation constellations that are used to transmit uplink data by the terminal device and that are determined by the network device all are fixed modulation constellations by default, the indication information may include only the first signature matrix information and the first signature sequence information.

Therefore, the network device can use less information to indicate a signature matrix and a modulation constellation that are used to transmit an uplink data stream by the terminal device. Therefore, according to the method, a system network capacity can be effectively increased, and further, system overheads can be reduced.

FIG. 4 further shows another embodiment of the method 220 for determining indication information in this embodiment of the present disclosure. As shown in FIG. 4, in this embodiment of the present disclosure, optionally, the determining indication information that is used to indicate the first signature sequence and the first modulation constellation includes:

S223. Determine that the indication information includes second signature sequence information and first modulation constellation information, where the second signature sequence information is used to indicate a second signature sequence, and the first modulation constellation information is used to indicate the first modulation constellation.

Specifically, in this embodiment of the present disclosure, the network device and the terminal device may store a signature sequence and a modulation constellation that are pre-designed. In this embodiment of the present disclosure, the network device allocates or specifies a signature sequence and a modulation constellation that are used to transmit an uplink data stream by the terminal device. The network device may determine that the signature sequence is the second signature sequence, and may determine that the modulation constellation is the first modulation constellation. Therefore, the network device may determine, according to the second signature sequence and the first modulation constellation, that the indication information includes the second signature sequence information and the first modulation constellation information.

For example, the indication information may include two logical information segments. Logical information segment 1 may carry the second signature sequence information, used to indicate the second signature sequence included in the indication information. Logical information segment 2 may carry the first modulation constellation information, used to indicate the first modulation constellation included in the indication information.

It should be understood that in this embodiment of the present disclosure, the logical information segments of the indication information may be consecutively or non-consecutively present in any sequential order in an instruction in which the indication information is located. This embodiment of the present disclosure sets no limit thereon.

Correspondingly, after receiving the instruction or a message that carries the indication information, the terminal device may learn, for example, according to logical information segment 1, which signature sequence is used to transmit a to-be-transmitted uplink data stream; and may learn, according to logical information segment 2, which modulation order or which modulation constellation is used to transmit the to-be-transmitted uplink data stream. Therefore, the terminal device can transmit the uplink data stream according to a signature sequence and a modulation constellation that are finally determined. That is, the terminal device can perform constellation mapping on the uplink data stream, and perform amplitude and phase adjustment on a modulation symbol obtained by means of constellation mapping. In this way, the non-orthogonal multiple access system can normally run, and a system network capacity can be effectively increased.

In this embodiment of the present disclosure, each modulation constellation may be corresponding to a modulation order. Therefore, logical information segment 2 may further indicate, in a manner of indicating a modulation order, a modulation constellation used to transmit the to-be-transmitted uplink data stream by the terminal device. Correspondingly, the terminal device may learn, according to logical information segment 2, the modulation order corresponding to the to-be-transmitted uplink data stream, so as to determine the modulation constellation corresponding to the modulation order in a one-to-one manner, and transmit the uplink data stream.

That is, in this embodiment of the present disclosure, optionally, the first modulation constellation information includes modulation order information of the first modulation constellation.

It should be understood that, in this embodiment of the present disclosure, if the logical information segments indicate index values, the network device and the terminal device side need to pre-establish consistent index relationships between related information, such as an index relationship between a signature sequence index value and a signature sequence in each signature matrix, an index relationship between an modulation constellation index value and each modulation constellation, an index relationship between a modulation order index value and each modulation order, or an index relationship between a modulation order index value and each modulation constellation, so that the network device and the terminal device can uniquely determine a corresponding signature matrix and modulation constellation according to the index values indicated by the logical information segments and according to the pre-established related index relationships.

It should be further understood that, in this embodiment of the present disclosure, the network device and the terminal device may use multiple methods to pre-store a signature sequence. A simple and direct method is storing all included zero elements and non-zero elements in a manner described above:

$$\begin{pmatrix} s_{1,m} \\ s_{2,m} \\ \vdots \\ s_{N,m} \end{pmatrix}.$$

This embodiment of the present disclosure merely uses the example to describe storage of the signature sequence. However, it should be understood that this embodiment of the present disclosure is not limited thereto, and the network device and the terminal device may use another method to pre-store the signature sequence.

It should be further understood that this embodiment of the present disclosure merely uses the foregoing solution as an example for description. However, the present disclosure is not limited thereto. For example, when signature sequences that are used to transmit uplink data by the terminal device and that are determined by the network device all belong to a same signature matrix or when a same signature matrix is used by default, the indication information may include only the first modulation constellation information. For another example, when modulation constellations that are used to transmit uplink data by the terminal device and that are determined by the network device all are fixed modulation constellations or use a fixed modulation order by default, the indication may include only the second signature sequence information.

Therefore, the network device can use less information to indicate a signature matrix and a modulation constellation that are used to transmit an uplink data stream by the terminal device. Therefore, according to the method, a system network capacity can be effectively increased, and further, system overheads can be reduced.

It should be understood that the present disclosure merely uses the embodiment shown in FIG. 4 as an example for description. However, the present disclosure is not limited thereto, and another method may be used to indicate, to the terminal device, a signature sequence and a modulation constellation that are allocated or specified by the network device.

Therefore, according to the indication information transmission method in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

In addition, the network device can use less information to indicate a signature matrix and a modulation constellation that are used to transmit an uplink data stream by the terminal device. Therefore, according to the method, a system network capacity can be effectively increased, and further, system overheads can be reduced.

In this embodiment of the present disclosure, the network device may transmit the indication information to the terminal device in multiple manners. For example, the network device may transmit the indication information to the terminal device in a dynamic or semi-persistent manner by using a downlink control channel. Alternatively, the network device may transmit the indication information to the terminal device in a semi-persistent manner by using a data channel. Alternatively, the network device may transmit the indication information to the terminal device in a persistent manner by using a broadcast channel or a data channel.

Optionally, in this embodiment of the present disclosure, the transmitting the indication information to the terminal device includes: transmitting an uplink scheduling grant message, dedicated higher-layer control signaling, or a system broadcast message to the terminal device. The uplink scheduling grant message, the dedicated higher-layer control signaling, and the system broadcast message include the indication information.

Specifically, in this embodiment of the present disclosure, for example, when the terminal device needs to use the non-orthogonal multiple access technology to transmit an uplink data stream, the terminal device may transmit an uplink scheduling request to the network device, to request the network device to allocate to or specify for the terminal device, a signature sequence, a modulation constellation, and another system resource and parameter, such as a frequency resource, a transmit power, and a modulation and coding scheme.

After receiving the uplink scheduling request of the terminal device, the network device may allocate to or specify for the to-be-transmitted data stream of the terminal device, the signature sequence, the modulation constellation, and the another system resource and parameter according to a data caching status and other related information (such as channel status information of a user) that are periodically or non-periodically reported by the terminal device; add, to an uplink scheduling grant message, the allocated or specified signature sequence and modulation constellation that are used for indication together with the another system resource and parameter; and transmit the uplink scheduling grant message to the terminal device.

After receiving the uplink scheduling grant message transmitted by the network device, the terminal device may use the signature sequence, the modulation constellation, and the another system resource and parameter that are indicated by the uplink scheduling grant message, and use the non-orthogonal multiple access technology to transmit the uplink data stream.

In the foregoing procedure, the indication information that is used to indicate the signature sequence and the modulation constellation may be used as a part of downlink control information (DCI), added to the uplink scheduling grant message, and transmitted to the terminal device in a dynamic or semi-persistent manner by using a physical downlink control channel, for example, a physical downlink control channel (PDCCH) in a Long Term Evolution (LTE) system.

For another example, the indication information that is used to indicate the signature sequence and the modulation constellation may be added to a radio resource control (RRC) connection setup message or an RRC connection reconfiguration message, and transmitted to the terminal device in a semi-persistent manner by using a physical downlink data channel, for example, a physical downlink shared channel (PDSCH) in the LTE system.

Optionally, the dedicated higher-layer control signaling includes a radio resource control RRC connection setup message and an RRC connection reconfiguration message. It should be understood that, this embodiment of the present disclosure merely uses that the dedicated higher-layer control signaling includes the RRC connection setup message and the RRC connection reconfiguration message as an example for description. However, the present disclosure is not limited thereto, and other dedicated higher-layer control signaling may be used to transmit the indication information to the terminal device.

For another example, the indication information that is used to indicate the signature sequence and the modulation constellation may be added to the system broadcast message, for example, a master information block (MIB) or a system information block (SIB) in the LTE system, and transmitted to the terminal device in a persistent manner by using a physical downlink broadcast channel or a physical downlink data channel, for example, a physical broadcast channel (PBCH) or a physical downlink shared channel PDSCH in the LTE system.

In this embodiment of the present disclosure, the network device transmits the indication information to the terminal device in at least one of a bit string manner or a tabular manner. Optionally, the indication information is bit string information.

Specifically, in this embodiment of the present disclosure, the logical information segment in the indication information may be implemented by using multiple methods, including but not limited to the following:

Manner 1: The logical information segment uses an independent bit string or a bitmap to implement an information indication function.

In the embodiment described above, assuming that information indicated by a logical information segment in the indication information (for example, the logical information segment is used to indicate a signature matrix) has K possibilities at maximum (for example, there are totally K signature matrices), the logical information segment may be represented by using a bitmap $$\overline{b_1, b_2, \ldots, b_L}^{L}$$

that includes $L=\text{ceil}(\log_2(K))$ bits, where ceil(•) represents rounding up to an integer. A value in the bitmap represents one index value of the indication information. The terminal device may determine, according to the index value represented by the bitmap and a pre-established index relationship, a unique possibility corresponding to the index value.

For example, the indication information includes first signature matrix information, first signature sequence information, and first modulation constellation information. Assuming that that the network device and the terminal device both store $K_1 \geq 1$ signature sequences, each signature matrix includes $K_2 \geq 1$ signature sequences at maximum, and there are $K_3 \geq 1$ stored modulation constellations, a bitmap $$\overline{b_1, b_2, \ldots, b_{L_i}}^{L_i}$$

that includes $L_i=\text{ceil}(\log_2(K_i))$ bits may be used to represent and implement an information indication function of logical information segment i, that is, indicating one of $K_i \geq 1$ possibilities, where i=1, 2, 3, and ceil(•) represents rounding up to an integer. For example, when $L_1=2$, $L_2=4$, and $L_3=3$, a possibility of the indication information is $$\overline{01}^{2} \overline{0101}^{4} \overline{00}^{3}.$$

The indication information may include 2+4+3=9 bits, and indicate the following information: a signature matrix corresponding to signature matrix index 1, a signature sequence that is in the signature matrix and that is corresponding to signature sequence index 6, and a modulation constellation corresponding to modulation constellation index (or modulation order index) 4.

It should be understood that, in the foregoing example, the three logical information segments in the indication information all use independent bit strings or bitmaps to implement the information indication functions. However, actually, it is not required that all the logical information segments use a same implementation. Therefore, in an actual application, some logical information segments may use independent bitmaps to implement information indication functions of the logical information segments, and other logical information segments use other means for implementation. This embodiment of the present disclosure is not limited thereto.

It should be further understood that the foregoing uses only one specific embodiment of the present disclosure as an example for description. It should be noted that the method may also be used to implement a logical information segment in indication information of another embodiment of the present disclosure.

Manner 2: Multiple logical information segments are combined for indication.

Combined indication of the logical information segments may be generally implemented in a tabular form. A table may be in the following form. The table includes multiple columns, one of the columns is a comprehensive index column, and each index value is corresponding to a combination of information indicated by the multiple logical information segments. Except for the comprehensive index column, each of the other columns in the table may be corresponding to one logical information segment, and is used to indicate a possibility of information indicated by the corresponding logical information segment. A value of the column may be an index value, or may be specific content that is indicated, such as a signature matrix, a signature sequence, a modulation constellation, or a modulation order.

According to the table described above, the network device and the terminal device may establish correspondences between a comprehensive index value and all possible combinations of information indicated by the multiple logical information segments. The network device transmits the comprehensive index value to the terminal device according to the indication information. The terminal device may learn, according to the comprehensive index value by querying the table, a unique possibility corresponding to information indicated by each logical information segment.

The example in which the indication information includes the first signature matrix information, the first signature sequence information, and the first modulation constellation information is still used for description. A tabular form for implementing the indication information is shown in Table 1.

TABLE 1

| Index | Signature matrix or signature matrix index | Signature sequence or signature sequence index | Modulation constellation, modulation constellation index, modulation order, or modulation order index |
|---|---|---|---|
| ... | ... | ... | ... |
| m | i | j | k |
| ... | ... | ... | ... |

As shown in Table 1, a combined indication table of the multiple logical information segments may include four columns. The first column is a comprehensive index column (referred to as an LDS index column in the example), and the other three columns are corresponding to three logical information segments in the indication information respectively. m is an index value. i, j, and k may be index values of information indicated by the logical information segments, or may be specific content of corresponding information, such as a signature matrix, a signature sequence, or a modulation constellation stored in the form described above.

It should be understood that, in the example described above, all the logical information segments in the indication information are combined for indication. Actually, it is not required that all the logical information segments use a same implementation. Therefore, in an actual application, some logical information segments may implement their information indication functions by means of combined indication, and other logical information segments use other means for implementation. This embodiment of the present disclosure is not limited thereto.

It should be further understood that the foregoing uses only one specific embodiment of the present disclosure as an example for description. It should be noted that the method may also be used to implement a logical information segment in indication information of another embodiment of the present disclosure.

Manner 3: A logical information segment is combined with an information segment that has another indication function and that is in a message or an instruction in which the indication information is located, for indication.

This manner is also generally implemented in a tabular form. A table may be in the following form. The table includes multiple columns, one of the columns is a comprehensive index column, and each index value represents a combination of content indicated by the other columns. Except for the comprehensive index column, at least one column in the table is corresponding to a logical information segment in the indication information in this embodiment of the present disclosure, and represents one possibility of content indicated by the corresponding logical information segment. A value of the column may be an index value, or may be specific content that is indicated, such as a signature matrix, a signature sequence, a modulation constellation, or an adjustment order.

At least one of the other columns in the table is corresponding to an information segment with another information (different from the information indicated by the logical information segments in the indication information in this embodiment of the present disclosure) indication function, such as an information segment indicating a transport block size, or an information segment indicating a redundancy version.

According to the table, the network device and the terminal device may establish correspondences of all possible combinations between a comprehensive index and the information indicated by the logical information segment in the indication information in this embodiment of the present disclosure, and between the comprehensive index and the information indicated by the information segment with another information indication function. The network device transmits a comprehensive index value according to the indication information. The terminal device may learn, according to the comprehensive index value by querying the table, a unique possibility corresponding to the information indicated by the logical information segment in the indication information in this embodiment of the present disclosure, and a unique possibility corresponding to information indicated by the information segment with the another information indication function.

It should be understood that the foregoing uses only one specific embodiment of the present disclosure as an example for description. It should be noted that the method may also be used to implement a logical information segment in indication information of another embodiment of the present disclosure.

It should be further understood that, in this embodiment of the present disclosure, the logical information segments in the indication information all are logic concepts. In the message or the instruction in which the indication information is located, such as an uplink scheduling grant message, an RRC connection setup message, an RRC connection reconfiguration message, or a broadcast message, if an information segment or a bit string implements an information indication function of a logical information segment in the foregoing embodiment, it should be understood or considered that the information segment or the bit string is implementation of the corresponding logical information segment in the foregoing embodiment. The information segment or the bit string herein may be any part of all bits that are used to constitute the message or the instruction in which the indication information is located, including an information bit and a check bit, such as a cyclic redundancy check (CRC) bit that is scrambled by using a radio network temporary identifier (RNTI) of the terminal device.

The foregoing details various implementations of the indication information. The following details, by using an example of an LTE system using the non-orthogonal multiple access technology, a specific application of this embodiment of the present disclosure in the LTE system.

In the LTE system, the network device transmits, according to an uplink scheduling grant message, the following information segment for each to-be-transmitted uplink transport block (where the transport block is equivalent to data or a data stream in this embodiment of the present disclosure) of the terminal device, to indicate corresponding information:

a modulation and coding scheme and redundancy version information segment: 5 bits, used to indicate a size of the transport block, a modulation order, and a redundancy version number; and a new data indication information segment: 1 bit, used to indicate whether the transport block is retransmitted data or new data.

After the LTE system introduces the non-orthogonal multiple access technology, when the information segments are transmitted for each transport block of the terminal device, it further needs to transmit one or more logical information segments described in this embodiment of the present disclosure, to indicate a signature sequence and/or a modulation constellation. The following describes several applications in the LTE system using the non-orthogonal multiple access technology in this embodiment of the present disclosure.

In an embodiment in which the indication information includes the first signature matrix information, the first signature sequence information, and the first modulation constellation information, the network device may transmit, by using an uplink scheduling grant message, the following information segments for a transport block of the terminal device, to indicate corresponding information:

transport block i, where i=1 or 2:

a signature matrix indication information segment: $L_7$ bits, used to indicate a signature matrix for transmitting the transport block;

a signature sequence indication information segment: $L_8$ bits, used to indicate a signature sequence for transmitting the transport block;

a modulation and coding scheme and redundancy version information segment: 5 bits, used to indicate a size of the transport block, a modulation order, and a redundancy version number; and a new data indication information segment: 1 bit, used to indicate whether the transport block is retransmitted data or new data.

After receiving and decoding the uplink scheduling grant message, with regard to each transport block, the terminal device may learn, according to the corresponding signature matrix indication information segment, which signature matrix is used to transmit the transport block; may learn, according to the corresponding signature sequence indication information segment, which signature sequence in the signature matrix is used to transmit the transport block; and further, may learn, according to the modulation and coding scheme and redundancy version information segment, a modulation order used to transmit the transport block, and a modulation constellation corresponding to the modulation order, so that the terminal device can transmit the transport block according to the signature sequence and the modulation constellation.

In an embodiment in which the indication information includes second signature sequence information and the first modulation constellation information, and the network device may transmit, by using an uplink scheduling grant message, the following information segments for a transport block of the terminal device, to indicate corresponding information:

transport block i, where i=1 or 2:

a signature sequence indication information segment: $L_9$ bits, used to indicate a signature sequence for transmitting the transport block;

a modulation and coding scheme and redundancy version information segment: 5 bits, used to indicate a size of the transport block, a modulation order, and a redundancy version number; and a new data indication information segment: 1 bit, used to indicate whether the transport block is retransmitted data or new data.

After receiving and decoding the uplink scheduling grant message, with regard to each transport block, the terminal device may learn, according to the corresponding signature sequence indication information segment, which signature sequence is used to transmit the transport block; and further, may learn, according to the modulation and coding scheme and redundancy version information segment, a modulation order that is used to transmit the transport block, and a modulation constellation corresponding to the modulation order, so that the terminal device can transmit the transport block according to the signature sequence and the modulation constellation.

It should be understood that the foregoing describes only multiple possible specific applications in the LTE system in this embodiment of the present disclosure. However, the present disclosure is not limited thereto. In the LTE system using the non-orthogonal multiple access technology, the network device may further transmit other information segments to indicate the signature sequence and the modulation constellation.

In this embodiment of the present disclosure, optionally, the signature sequence is a low-density signature LDS sequence. Further, optionally, a quantity of zero elements included in the signature sequence is greater than or equal to a quantity of non-zero elements.

It should be further understood that serial numbers of the foregoing processes do not denote an execution sequence in the embodiments of the present disclosure. The execution sequence of the processes should be determined according to functions and internal logic of the processes, and should not be construed as any limitation on the implementation processes of the embodiments of the present disclosure.

Therefore, according to the indication information transmission method in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

In addition, the network device can use less information to indicate a signature matrix and a modulation constellation that are used to transmit an uplink data stream by the terminal device. Therefore, according to the method, a system network capacity can be effectively increased, and further, system overheads can be reduced.

The foregoing details the indication information transmission method in this embodiment of the present disclosure from a perspective of a network device with reference to FIG. 3 and FIG. 4. The following describes an indication information transmission method in an embodiment of the present disclosure from a perspective of a terminal device with reference to FIG. 5 to FIG. 7.

Figure 5:
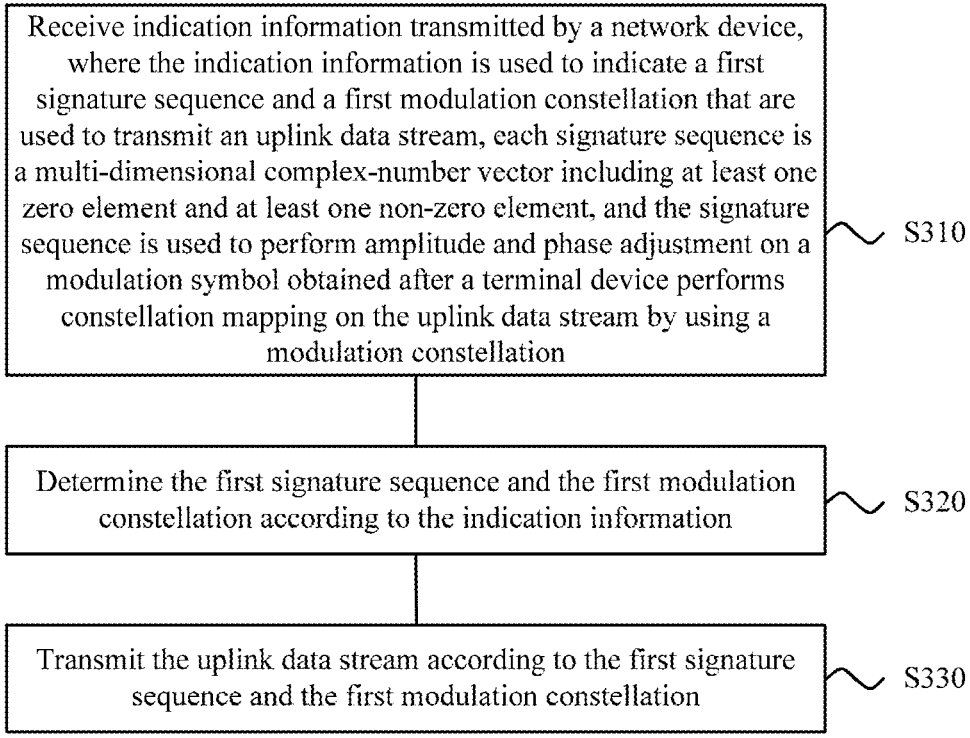
FIG. 5 is a schematic flowchart of an indication information transmission method according to another embodiment of the present disclosure.

As shown in FIG. 5, an indication information transmission method 300 in this embodiment of the present disclosure may be executed, for example, by a terminal device in a communications system, and the terminal device is, for example, user equipment. As shown in FIG. 5, the method 300 includes the following steps:

S310. Receive indication information transmitted by a network device, where the indication information is used to indicate a first signature sequence and a first modulation constellation that are used to transmit an uplink data stream, each signature sequence is a multi-dimensional complex-number vector including at least one zero element and at least one non-zero element, and the signature sequence is used to perform amplitude and phase adjustment on a modulation symbol obtained after a terminal device performs constellation mapping on the uplink data stream by using a modulation constellation.

S320. Determine the first signature sequence and the first modulation constellation according to the indication information.

S330. Transmit the uplink data stream according to the first signature sequence and the first modulation constellation.

Specifically, in a non-orthogonal multiple access system such as an LDS system, the network device allocates or specifies a signature sequence and a modulation constellation to or for a to-be-transmitted uplink data stream of the terminal device. To make the terminal device learn the signature sequence and the first modulation constellation that have been allocated by the network device, the network device may determine indication information, and transmit the indication information to the terminal device. The indication information is used to indicate the signature sequence and the modulation constellation that are used to transmit the uplink data stream by the terminal device. After receiving the indication information transmitted by the network device, the terminal device may determine the signature sequence and the modulation constellation used to transmit the uplink data stream, and may transmit the uplink data stream according to the signature sequence and the modulation constellation. Therefore, the network device and the terminal device exchange information, so that the terminal device can determine the signature sequence and the modulation constellation that are allocated by the network device, and the non-orthogonal multiple access system can normally run.

Therefore, according to the indication information transmission method in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

It should be understood that in this embodiment of the present disclosure, a signature matrix includes one or more signature sequences. The signature sequence is a multi-dimensional complex-number vector including at least one zero element and at least one non-zero element. The signature sequence is used to perform amplitude and phase adjustment on a modulation symbol that is obtained after the terminal device or the network device performs constellation mapping on a data stream by using a modulation constellation.

It should be further understood that, when this embodiment of the present disclosure is applied, it further needs to assume that the network device and the terminal device in the non-orthogonal multiple access system both store some or all of the following pre-designed content:

(1) One or more signature matrices:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M},$$

where $s_{n,m} = \alpha * \exp(j*\beta)$, $1 \leq n \leq N$, $1 \leq m \leq M$, $\alpha$ and $\beta$ may be any real numbers; M and N both are integers greater than 1; in addition, for each m, $1 \leq m \leq M$; there is at least one group of $i_m$ and $j_m$; and $1 \leq i_m \neq j_m \leq M$, so that $s_{i_m,m} = 0$ and $s_{j_m,m} \neq 0$;

(2) One or more signature sequences:

$$\begin{pmatrix} s_{1,m} \\ s_{2,m} \\ \vdots \\ s_{N,m} \end{pmatrix},$$

where $1 \leq m \leq M$; and (3) One or more modulation constellations: $\{q_1, q_2, \ldots, q_{Q_m}\}$, where $Q_m \geq 2$, and each modulation constellation is corresponding to a modulation order.

It should be further understood that serial numbers of the foregoing processes do not denote an execution sequence in the embodiments of the present disclosure. The execution sequence of the processes should be determined according to functions and internal logic of the processes, and should not be construed as any limitation on the implementation processes of the embodiments of the present disclosure.

Figure 6:
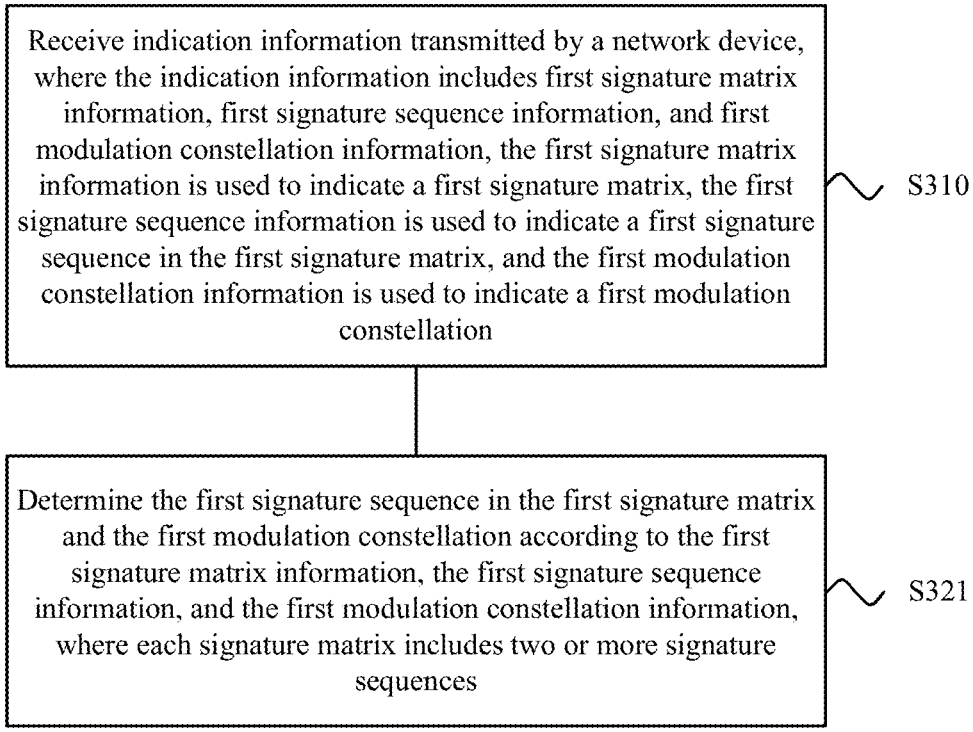
FIG. 6 is another schematic flowchart of an indication information transmission method according to another embodiment of the present disclosure.
Figure 7:
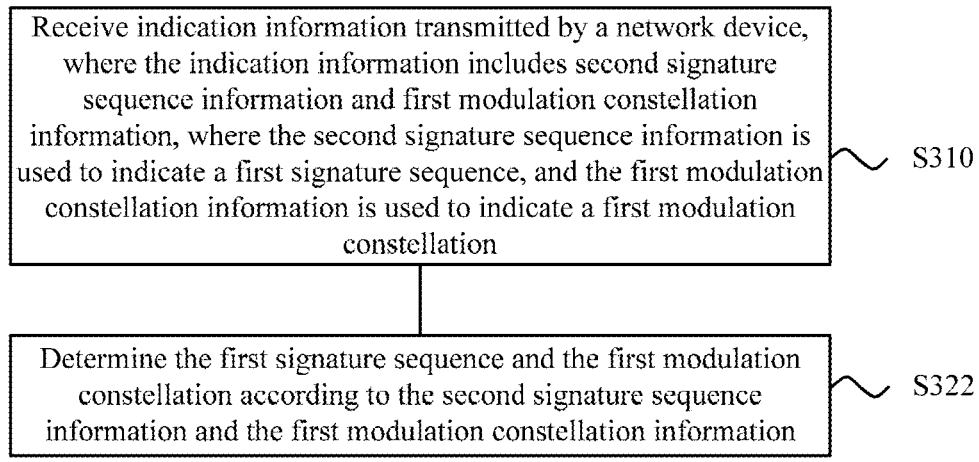
FIG. 7 is still another schematic flowchart of an indication information transmission method according to another embodiment of the present disclosure.

With reference to FIG. 6 and FIG. 7, the following details the method 320 for determining the first signature sequence and the first modulation constellation according to the indication information in this embodiment of the present disclosure.

As shown in FIG. 6, in this embodiment of the present disclosure, optionally, the indication information includes first signature matrix information, first signature sequence information, and first modulation constellation information. The first signature matrix information is used to indicate a first signature matrix, the first signature sequence information is used to indicate the first signature sequence in the first signature matrix, and the first modulation constellation information is used to indicate the first modulation constellation.

The determining the first signature sequence and the first modulation constellation according to the indication information includes:

S321. Determine the first signature sequence in the first signature matrix and the first modulation constellation according to the first signature matrix information, the first signature sequence information, and the first modulation constellation information, where each signature matrix includes two or more signature sequences.

Specifically, in this embodiment of the present disclosure, the network device and the terminal device may store a signature matrix, a signature sequence, and a modulation constellation that are pre-designed. Alternatively, the network device and the terminal device may store a signature matrix and a modulation constellation that are pre-designed. A column of the signature matrix is a signature sequence. Therefore, in this embodiment of the present disclosure, storing the signature matrix also means storing a corresponding signature sequence.

In this embodiment of the present disclosure, the network device allocates or specifies a signature sequence and a modulation constellation that are used to transmit an uplink data stream by the terminal device. The network device may determine that the signature sequence is the first signature sequence in the first signature matrix, and the network device may determine that the modulation constellation is the first modulation constellation. Therefore, the network device may determine, according to the first signature sequence and the first modulation constellation, that the indication information includes the first signature matrix information, the first signature sequence information, and the first modulation constellation information. For example, the indication information may include three logical information segments. Logical information segment 1 may carry the first signature matrix information, used to indicate the first signature matrix included in the indication information. Logical information segment 2 may carry the first signature sequence information, used to indicate the first signature sequence in the first signature matrix. Logical information segment 3 may carry the first modulation constellation information, used to indicate the first modulation constellation included in the indication information.

It should be understood that in this embodiment of the present disclosure, the logical information segments of the indication information may be consecutively or non-consecutively present in any sequential order in an instruction in which the indication information is located. This embodiment of the present disclosure sets no limit thereon.

Correspondingly, after receiving an instruction or a message that carries the indication information, for example, the terminal device may learn, according to logical information segment 1, which signature matrix is used to transmit a to-be-transmitted uplink data stream; may learn, according to logical information segment 2, which signature sequence in the signature matrix indicated by logical information segment 1 is used to transmit the to-be-transmitted uplink data stream; and may learn, according to logical information segment 3, which modulation order or which modulation constellation is used to transmit the to-be-transmitted uplink data stream. Therefore, the terminal device can transmit the uplink data stream according to a signature sequence and a modulation constellation that are finally determined. That is, the terminal device can perform constellation mapping on the uplink data stream, and perform amplitude and phase adjustment on a modulation symbol obtained by means of constellation mapping. In this way, the non-orthogonal multiple access system can normally run, and a system network capacity can be effectively increased.

In this embodiment of the present disclosure, each modulation constellation may be corresponding to a modulation order. Therefore, logical information segment 3 may further indicate, in a manner of indicating a modulation order, a modulation constellation used to transmit the to-be-transmitted uplink data stream by the terminal device. Correspondingly, the terminal device may learn, according to logical information segment 3, the modulation order corresponding to the to-be-transmitted uplink data stream, so as to determine the modulation constellation corresponding to the modulation order in a one-to-one manner, and transmit the uplink data stream.

That is, in this embodiment of the present disclosure, optionally, the first modulation constellation information includes modulation order information of the first modulation constellation.

It should be understood that, in this embodiment of the present disclosure, if the logical information segments indicate index values, the network device side and the terminal device side need to pre-establish consistent index relationships between related information, such as an index relationship between a signature matrix index value and a signature matrix, an index relationship between a signature sequence index value and a signature sequence in each signature matrix, and an index relationship between an modulation constellation index value and each modulation constellation, so that the network device and the terminal device can uniquely determine a corresponding signature matrix, signature sequence, and modulation constellation according to the index values indicated by the logical information segments and according to the pre-established related index relationships.

It should be further understood that, in this embodiment of the present disclosure, the network device and the terminal device may use multiple methods to pre-store a signature matrix. A simple and direct method is storing all included zero elements and non-zero elements in a manner described above:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}$$

This embodiment of the present disclosure merely uses the example to describe storage of the signature matrix. However, it should be understood that this embodiment of the present disclosure is not limited thereto, and the network device and the terminal device may use another method to pre-store the signature matrix.

It should be further understood that this embodiment of the present disclosure merely uses the foregoing solution as an example for description. However, the present disclosure is not limited thereto. For example, when signature sequences that are used to transmit uplink data by the terminal device and that are determined by the network device all belong to a same signature matrix or when a same signature matrix is used by default, the indication information may include only the first signature sequence information and the first modulation constellation information. For another example, when signature sequences that are used to transmit uplink data by the terminal device and that are determined by the network device all are signature sequences with fixed serial numbers by default, the indication information may include only the first signature matrix information and the first modulation constellation information. For another example, when modulation constellations that are used to transmit uplink data by the terminal device and that are determined by the network device all are fixed modulation constellations by default, the indication information may include only the first signature matrix information and the first signature sequence information.

Therefore, according to the method, less information can be used to indicate a signature matrix and a modulation constellation that are used to transmit an uplink data stream by the terminal device. Therefore, according to the method, a system network capacity can be effectively increased, and further, system overheads can be reduced.

FIG. 7 shows another embodiment of the method 320 for determining the first signature sequence and the first modulation constellation according to the indication information in this embodiment of the present disclosure. As shown in FIG. 7, in this embodiment of the present disclosure, optionally, the indication information includes second signature sequence information and first modulation constellation information. The second signature sequence information is used to indicate the first signature sequence, and the first modulation constellation information is used to indicate the first modulation constellation.

The determining the first signature sequence and the first modulation constellation according to the indication information includes:

S322. Determine the first signature sequence and the first modulation constellation according to the second signature sequence information and the first modulation constellation information.

Specifically, in this embodiment of the present disclosure, the network device and the terminal device may store a signature sequence and a modulation constellation that are pre-designed. In this embodiment of the present disclosure, the network device allocates or specifies a signature sequence and a modulation constellation that are used to transmit an uplink data stream by the terminal device. The network device may determine that the signature sequence is the second signature sequence, and may determine that the modulation constellation is the first modulation constellation. Therefore, the network device may determine, according to the second signature sequence and the first modulation constellation, that the indication information includes the second signature sequence information and the first modulation constellation information.

For example, the indication information may include two logical information segments. Logical information segment 1 may carry the second signature sequence information, used to indicate the second signature sequence included in the indication information. Logical information segment 2 may carry the first modulation constellation information, used to indicate the first modulation constellation included in the indication information.

It should be understood that in this embodiment of the present disclosure, the logical information segments of the indication information may be consecutively or non-consecutively present in any sequential order in an instruction in which the indication information is located. This embodiment of the present disclosure sets no limit thereon.

Correspondingly, after receiving the instruction or a message that carries the indication information, the terminal device may learn, for example, according to logical information segment 1, which signature sequence is used to transmit a to-be-transmitted uplink data stream; and may learn, according to logical information segment 2, which modulation order or which modulation constellation is used to transmit the to-be-transmitted uplink data stream. Therefore, the terminal device can transmit the uplink data stream according to a signature sequence and a modulation constellation that are finally determined. That is, the terminal device can perform constellation mapping on the uplink data stream, and perform amplitude and phase adjustment on a modulation symbol obtained by means of constellation mapping. In this way, the non-orthogonal multiple access system can normally run, and a system network capacity can be effectively increased.

In this embodiment of the present disclosure, each modulation constellation may be corresponding to a modulation order. Therefore, logical information segment 2 may further indicate, in a manner of indicating a modulation order, a modulation constellation used to transmit the to-be-transmitted uplink data stream by the terminal device. Correspondingly, the terminal device may learn, according to logical information segment 2, the modulation order corresponding to the to-be-transmitted uplink data stream, so as to determine the modulation constellation corresponding to the modulation order in a one-to-one manner, and transmit the uplink data stream.

That is, in this embodiment of the present disclosure, optionally, the first modulation constellation information includes modulation order information of the first modulation constellation.

It should be understood that, in this embodiment of the present disclosure, if the logical information segments indicate index values, the network device and the terminal device side need to pre-establish consistent index relationships between related information, such as an index relationship between a signature sequence index value and a signature sequence in each signature matrix, an index relationship between an modulation constellation index value and each modulation constellation, an index relationship between a modulation order index value and each modulation order, or an index relationship between a modulation order index value and each modulation constellation, so that the network device and the terminal device can uniquely determine a corresponding signature matrix and modulation constellation according to the index values indicated by the logical information segments and according to the pre-established related index relationships.

It should be further understood that, in this embodiment of the present disclosure, the network device and the terminal device may use multiple methods to pre-store a signature sequence. A simple and direct method is storing all included zero elements and non-zero elements in a manner described above:

$$\begin{pmatrix} s_{1,m} \\ s_{2,m} \\ \vdots \\ s_{N,m} \end{pmatrix}.$$

This embodiment of the present disclosure merely uses the example to describe storage of the signature sequence. However, it should be understood that this embodiment of the present disclosure is not limited thereto, and the network device and the terminal device may use another method to pre-store the signature sequence.

It should be further understood that this embodiment of the present disclosure merely uses the foregoing solution as an example for description. However, the present disclosure is not limited thereto. For example, when signature sequences that are used to transmit uplink data by the terminal device and that are determined by the network device all belong to a same signature matrix or when a same signature matrix is used by default, the indication information may include only second modulation constellation information. For another example, when modulation constellations that are used to transmit uplink data by the terminal device and that are determined by the network device all are fixed modulation constellations or use a fixed modulation order by default, the indication may include only the second signature sequence information.

Therefore, according to the method, less information can be used to indicate a signature matrix and a modulation constellation that are used to transmit an uplink data stream by the terminal device. Therefore, according to the method, a system network capacity can be effectively increased, and further, system overheads can be reduced.

It should be understood that the present disclosure merely uses the embodiment shown in FIG. 6 and FIG. 7 as an example for description. However, the present disclosure is not limited thereto, and another method may be used to indicate, to the terminal device, a signature sequence and a modulation constellation that are allocated or specified by the network device.

Optionally, in this embodiment of the present disclosure, the receiving indication information transmitted by a network device includes: receiving, from the network device, an uplink scheduling grant message, dedicated higher-layer control signaling, or a system broadcast message. The uplink scheduling grant message, the dedicated higher-layer control signaling, and the system broadcast message include the indication information.

Optionally, in this embodiment of the present disclosure, the dedicated higher-layer control signaling includes a radio resource control RRC connection setup message and an RRC connection reconfiguration message.

In this embodiment of the present disclosure, the network device transmits the indication information to the terminal device in at least one of a bit string manner or a tabular manner, as described above. For brevity, details are not described herein again. Optionally, the indication information is bit string information.

In this embodiment of the present disclosure, optionally, the signature sequence is a low-density signature LDS sequence. Further, optionally, a quantity of zero elements included in the signature sequence is greater than or equal to a quantity of non-zero elements.

It should be understood that, the network device and the terminal device exchange information, and related characteristics and functions that are described from the perspective of the network device side are corresponding to related characteristics and functions that are described from the perspective of the terminal device side. For brevity, details are not described herein again.

It should be further understood that serial numbers of the foregoing processes do not denote an execution sequence in the embodiments of the present disclosure. The execution sequence of the processes should be determined according to functions and internal logic of the processes, and should not be construed as any limitation on the implementation processes of the embodiments of the present disclosure.

Therefore, according to the indication information transmission method in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

In addition, according to the method, less information can be used to indicate a signature matrix and a modulation constellation that are used to transmit an uplink data stream by the terminal device. Therefore, according to the method, a system network capacity can be effectively increased, and further, system overheads can be reduced.

The foregoing details the indication information transmission method according to the embodiments of the present disclosure with reference to FIG. 3 to FIG. 7. The following details an indication information transmission apparatus according to an embodiment of the present disclosure with reference to FIG. 8 to FIG. 14.

Figure 8:
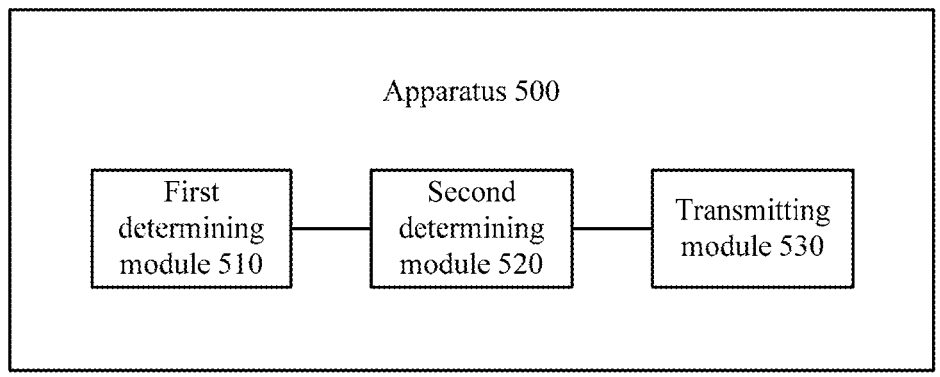
FIG. 8 is a schematic block diagram of an indication information transmission apparatus according to an embodiment of the present disclosure.

FIG. 8 shows an indication information transmission apparatus 500 according to this embodiment of the present disclosure. As shown in FIG. 8, the apparatus 500 includes:

a first determining module 510, configured to determine a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation;

a second determining module 520, configured to determine indication information used to indicate the first signature sequence and a first modulation constellation that are determined by the first determining module 510; and a transmitting module 530, configured to transmit, to the terminal device, the indication information determined by the second determining module 520.

Therefore, according to the indication information transmission apparatus in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

Figure 9:
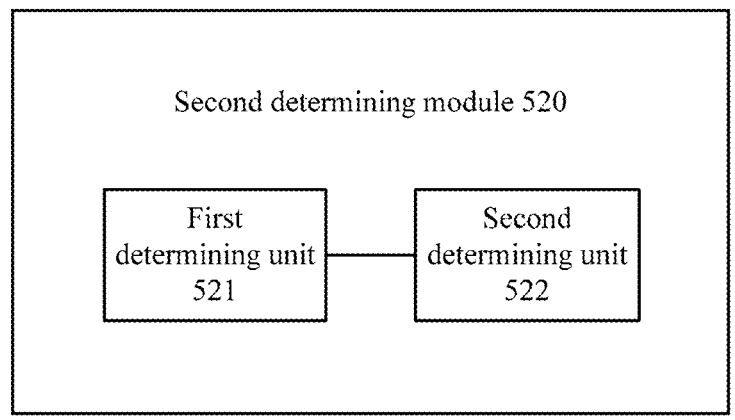
FIG. 9 is a schematic block diagram of a second determining module according to an embodiment of the present disclosure.

In this embodiment of the present disclosure, optionally, as shown in FIG. 9, the second determining module 520 includes:

a first determining unit 521, configured to determine that the first signature sequence belongs to a first signature matrix, where each signature matrix includes two or more signature sequences; and a second determining unit 522, configured to determine that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

Figure 10:
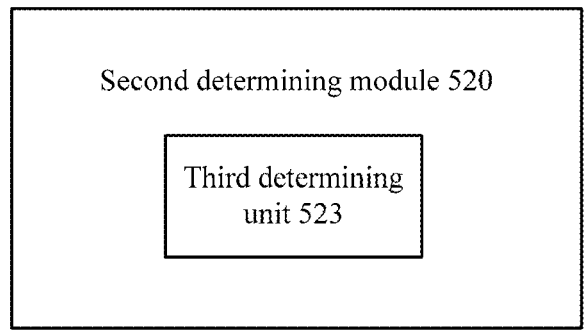
FIG. 10 is another schematic block diagram of a second determining module according to an embodiment of the present disclosure.

Optionally, in this embodiment of the present disclosure, as shown in FIG. 10, the second determining module 520 includes:

a third determining unit 523, configured to determine that the indication information includes second signature sequence information and first modulation constellation information, where the second signature sequence information is used to indicate a second signature sequence, and the first modulation constellation information is used to indicate the first modulation constellation.

In this embodiment of the present disclosure, optionally, the first modulation constellation information determined by the second determining module 520 includes modulation order information of the first modulation constellation.

In this embodiment of the present disclosure, optionally, the transmitting module 530 is specifically configured to transmit an uplink scheduling grant message, dedicated higher-layer control signaling, or a system broadcast message to the terminal device. The uplink scheduling grant message, the dedicated higher-layer control signaling, and the system broadcast message include the indication information.

In this embodiment of the present disclosure, optionally, the dedicated higher-layer control signaling includes a radio resource control RRC connection setup message and an RRC connection reconfiguration message.

In this embodiment of the present disclosure, optionally, the indication information determined by the second determining module 520 is bit string information.

In this embodiment of the present disclosure, optionally, the signature sequence is a low-density signature LDS sequence.

In this embodiment of the present disclosure, optionally, a quantity of zero elements included in the signature sequence is greater than or equal to a quantity of non-zero elements.

In this embodiment of the present disclosure, optionally, the apparatus 500 is a network device.

It should be understood that the indication information transmission apparatus 500 in this embodiment of the present disclosure may be corresponding to the network device in the method embodiment of the present disclosure. In addition, the foregoing and other operations and/or functions of the modules in the apparatus 500 are separately intended to implement corresponding processes of the methods 200 in FIG. 3 and FIG. 4. For brevity, details are not described herein again.

Therefore, according to the indication information transmission apparatus in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

In addition, the apparatus in this embodiment of the present disclosure can use less information to indicate a signature matrix and a modulation constellation that are used to transmit an uplink data stream by the terminal device. Therefore, through the apparatus, a system network capacity can be effectively increased, and further, system overheads can be reduced.

The foregoing details the indication information transmission apparatus in this embodiment of the present disclosure from a perspective of a network device side with reference to FIG. 8 to FIG. 10. The following details an indication information transmission apparatus in an embodiment of the present disclosure from a perspective of a terminal device side with reference to FIG. 11 and FIG. 12.

Figure 11:
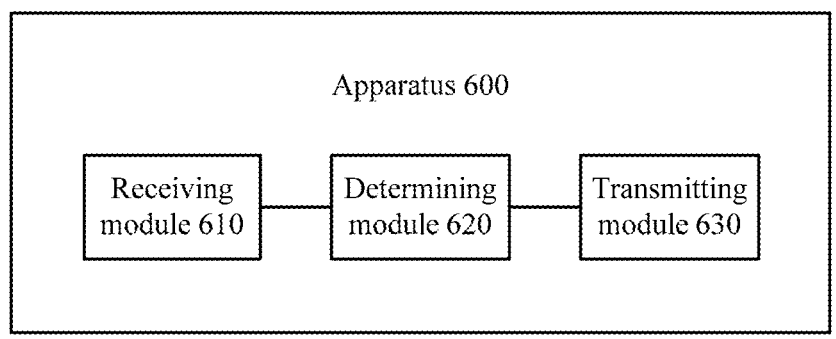
FIG. 11 is a schematic block diagram of an indication information transmission apparatus according to another embodiment of the present disclosure.

FIG. 11 shows an indication information transmission apparatus 600 according to this embodiment of the present disclosure. As shown in FIG. 11, the apparatus 600 includes:

a receiving module 610, configured to receive indication information transmitted by a network device, where the indication information is used to indicate a first signature sequence and a first modulation constellation that are used to transmit an uplink data stream, each signature sequence is a multi-dimensional complex-number vector including at least one zero element and at least one non-zero element, and the signature sequence is used to perform amplitude and phase adjustment on a modulation symbol obtained after a terminal device performs constellation mapping on the uplink data stream by using a modulation constellation;

a determining module 620, configured to determine the first signature sequence and the first modulation constellation according to the indication information received by the receiving module 610; and a transmitting module 630, configured to transmit the uplink data stream according to the first signature sequence and the first modulation constellation that are determined by the determining module 620.

Therefore, according to the indication information transmission apparatus in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

Figure 12:
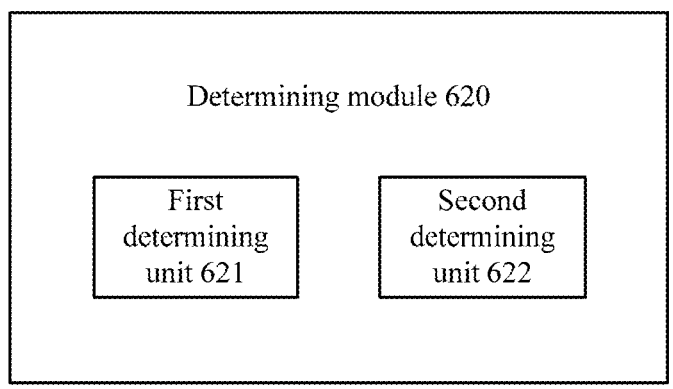
FIG. 12 is a schematic block diagram of a determining module according to an embodiment of the present disclosure.

In this embodiment of the present disclosure, optionally, as shown in FIG. 12, the indication information received by the receiving module 610 includes first signature matrix information, first signature sequence information, and first modulation constellation information, where the first signature matrix information is used to indicate a first signature matrix, the first signature sequence information is used to indicate the first signature sequence in the first signature matrix, and the first modulation constellation information is used to indicate the first modulation constellation.

The determining module 620 includes a first determining unit 621, configured to determine the first signature sequence in the first signature matrix and the first modulation constellation according to the first signature matrix information, the first signature sequence information, and the first modulation constellation information. Each signature matrix includes two or more signature sequences.

In this embodiment of the present disclosure, optionally, as shown in FIG. 12, the indication information received by the receiving module 610 includes second signature sequence information and first modulation constellation information. The second signature sequence information is used to indicate the first signature sequence, and the first modulation constellation information is used to indicate the first modulation constellation.

The determining module 620 includes a second determining unit 622, configured to determine the first signature sequence and the first modulation constellation according to the second signature sequence information and the first modulation constellation information.

Optionally, in this embodiment of the present disclosure, the first modulation constellation information received by the receiving module 610 includes modulation order information of the first modulation constellation.

Optionally, in this embodiment of the present disclosure, the receiving module 610 is specifically configured to receive, from the network device, an uplink scheduling grant message, dedicated higher-layer control signaling, or a system broadcast message. The uplink scheduling grant message, the dedicated higher-layer control signaling, and the system broadcast message include the indication information.

Optionally, in this embodiment of the present disclosure, the dedicated higher-layer control signaling includes a radio resource control RRC connection setup message and an RRC connection reconfiguration message.

Optionally, in this embodiment of the present disclosure, the indication information received by the receiving module 610 is bit string information.

Optionally, in this embodiment of the present disclosure, the signature sequence is a low-density signature LDS sequence.

Optionally, in this embodiment of the present disclosure, a quantity of zero elements included in the signature sequence is greater than or equal to a quantity of non-zero elements.

Optionally, in this embodiment of the present disclosure, the apparatus 600 is a terminal device.

It should be understood that the indication information transmission apparatus 600 in this embodiment of the present disclosure may be corresponding to the terminal device in the method embodiment of the present disclosure. In addition, the foregoing and other operations and/or functions of the modules in the apparatus 600 are separately intended to implement corresponding processes of the methods 300 in FIG. 5 to FIG. 7. For brevity, details are not described herein again.

Therefore, according to the indication information transmission apparatus in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

In addition, the apparatus in this embodiment of the present disclosure can receive a signature matrix and a modulation constellation that are used to transmit an uplink data stream and that are indicated by the network device by using less information. Therefore, the apparatus can effectively increase a system network capacity, and can further reduce system overheads.

Figure 13:
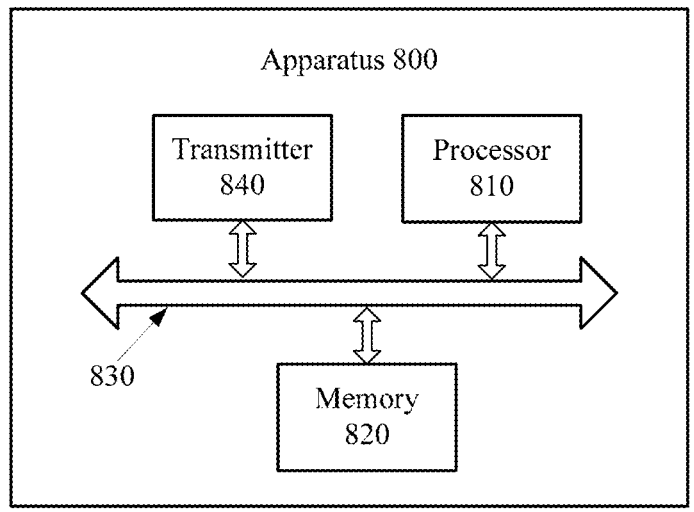
FIG. 13 is a schematic block diagram of an indication information transmission apparatus according to still another embodiment of the present disclosure.

As shown in FIG. 13, an embodiment of the present disclosure further provides an indication information transmission apparatus 800. The apparatus 800 includes a processor 810, a memory 820, a bus system. 830, and a transmitter 840. The processor 810, the memory 820, and the transmitter 840 are connected by using the bus system 830. The memory 820 is configured to store an instruction. The processor 810 is configured to execute the instruction stored in the memory 820, to control the transmitter 840 to transmit a signal.

The processor 810 is configured to: determine a first signature sequence and a first modulation constellation that are used to transmit an uplink data stream by a terminal device, where each signature sequence is a multi-dimensional complex-number vector including at least one zero element and at least one non-zero element, and the signature sequence is used to perform amplitude and phase adjustment on a modulation symbol obtained after the terminal device performs constellation mapping on the uplink data stream by using a modulation constellation; and determine indication information that is used to indicate the first signature sequence and the first modulation constellation.

The transmitter 840 is configured to transmit the indication information to the terminal device.

Therefore, according to the indication information transmission apparatus in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

It should be understood that, in this embodiment of the present disclosure, the processor 810 may be a central processing unit (CPU), or the processor 810 may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 820 may include a read-only memory and a random access memory, and provide instructions and data for the processor 810. Apart of the memory 820 may further include a non-volatile random access memory. For example, the memory 820 may further store device type information.

The bus system 830 may further include a power supply bus, a control bus, a status signal bus, and the like, in addition to a data bus. However, for clear description, various buses are marked as the bus system 830 in the figure.

In an implementation process, steps of the foregoing methods may be implemented by using an integrated logic circuit of hardware in the processor 810 or by using an instruction in a form of software. The steps of the methods disclosed with reference to the embodiments of the present disclosure may be directly implemented by using a hardware processor, or may be implemented by using a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information from the memory 820 and implements the steps of the foregoing methods in combination with hardware of the processor 810. To avoid repetition, no details are described herein.

Optionally, in an embodiment, that the processor 810 determines the indication information that is used to indicate the first signature sequence and the first modulation constellation includes:

determining that the first signature sequence belongs to a first signature matrix, where each signature matrix includes two or more signature sequences; and determining that the indication information includes first signature matrix information, first signature sequence information, and first modulation constellation information, where the first signature matrix information is used to indicate the first signature matrix, the first signature sequence information is used to indicate the first signature sequence in the first signature matrix, and the first modulation constellation information is used to indicate the first modulation constellation.

Optionally, in an embodiment, that the processor 810 determines the indication information that is used to indicate the first signature sequence and the first modulation constellation includes:

determining that the indication information includes second signature sequence information and first modulation constellation information, where the second signature sequence information is used to indicate a second signature sequence, and the first modulation constellation information is used to indicate the first modulation constellation.

Optionally, in an embodiment, the first modulation constellation information determined by the processor 810 includes modulation order information of the first modulation constellation.

Optionally, in an embodiment, that the transmitter 840 transmits the indication information to the terminal device includes:

transmitting an uplink scheduling grant message, dedicated higher-layer control signaling, or a system broadcast message to the terminal device, where the uplink scheduling grant message, the dedicated higher-layer control signaling, and the system broadcast message include the indication information.

Optionally, in an embodiment, the dedicated higher-layer control signaling includes a radio resource control RRC connection setup message and an RRC connection reconfiguration message.

Optionally, in an embodiment, the indication information determined by the processor 810 is bit string information.

Optionally, in an embodiment, the signature sequence is a low-density signature LDS sequence.

Optionally, in an embodiment, a quantity of zero elements included in the signature sequence is greater than or equal to a quantity of non-zero elements.

Optionally, in an embodiment, the apparatus 800 is a network device.

It should be understood that the indication information transmission apparatus 800 in this embodiment of the present disclosure may be corresponding to the network device and the apparatus 500 in this embodiment of the present disclosure, and may be corresponding to a corresponding body for executing the method of the embodiments of the present disclosure. In addition, the foregoing and other operations and/or functions of the modules in the apparatus 800 are separately intended to implement corresponding processes of the methods in FIG. 3 and FIG. 4. For brevity, details are not described herein again.

Therefore, according to the indication information transmission apparatus in this embodiment of the present disclosure, a network device determines a first signature sequence and a first modulation constellation that are used to transmit an uplink data stream by a terminal device, determines indication information that is used to indicate the first signature sequence and the first modulation constellation, and transmits the indication information to the terminal device, so that the terminal device can determine the first signature sequence and the first modulation constellation that are allocated by the network device, and perform data transmission by using the first signature sequence and the first modulation constellation. In this way, a system network capacity can be effectively increased.

In addition, the apparatus in this embodiment of the present disclosure can use less information to indicate a signature matrix and a modulation constellation that are used to transmit an uplink data stream by the terminal device. Therefore, according to the method, a system network capacity can be effectively increased, and further, system overheads can be reduced.

Figure 14:
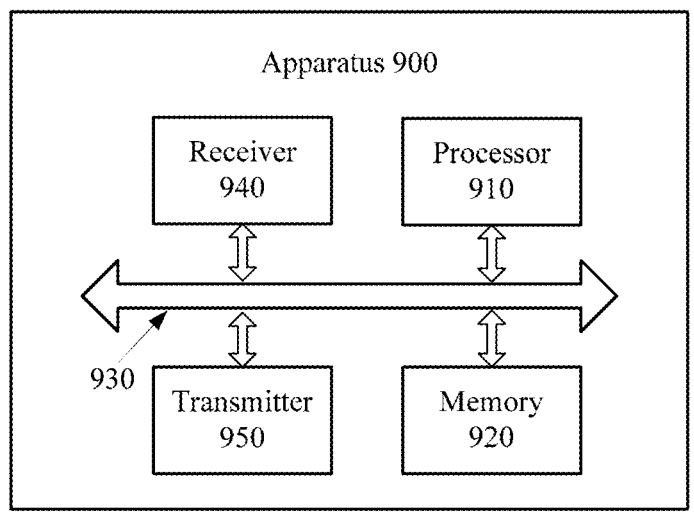
FIG. 14 is a schematic block diagram of an indication information transmission apparatus according to yet another embodiment of the present disclosure.

As shown in FIG. 14, an embodiment of the present disclosure further provides an indication information transmission apparatus 900. The apparatus 900 includes a processor 910, a memory 920, a bus system 930, a receiver 940, and a transmitter 950. The processor 910, the memory 920, the receiver 940, and the transmitter 950 are connected by using the bus system 930. The memory 920 is configured to store an instruction. The processor 910 is configured to execute the instruction stored in the memory 920, to control the receiver 940 to receive a signal and to control the transmitter 950 to transmit a signal.

The receiver 940 is configured to receive indication information transmitted by a network device. The indication information is used to indicate a first signature sequence and a first modulation constellation that are used to transmit an uplink data stream. Each signature sequence is a multi-dimensional complex-number vector including at least one zero element and at least one non-zero element. The signature sequence is used to perform amplitude and phase adjustment on a modulation symbol obtained after a terminal device performs constellation mapping on the uplink data stream by using a modulation constellation.

The processor 910 is configured to determine the first signature sequence and the first modulation constellation according to the indication information.

The transmitter 950 is configured to transmit the uplink data stream according to the first signature sequence and the first modulation constellation.

Therefore, according to the indication information transmission apparatus in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

It should be understood that, in this embodiment of the present disclosure, the processor 910 may be a central processing unit (CPU), or the processor 910 may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 920 may include a read-only memory and a random access memory, and provide instructions and data for the processor 910. A part of the memory 920 may further include a non-volatile random access memory. For example, the memory 920 may further store device type information.

The bus system 930 may further include a power supply bus, a control bus, a status signal bus, and the like, in addition to a data bus. However, for clear description, various buses are marked as the bus system 930 in the figure.

In an implementation process, steps of the foregoing methods may be implemented by using an integrated logic circuit of hardware in the processor 910 or by using an instruction in a form of software. The steps of the methods disclosed with reference to the embodiments of the present disclosure may be directly implemented by using a hardware processor, or may be implemented by using a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 920, and the processor 910 reads information from the memory 920 and implements the steps of the foregoing methods in combination with hardware of the processor 910. To avoid repetition, no details are described herein.

Optionally, in an embodiment, the indication information received by the receiver 940 includes first signature matrix information, first signature sequence information, and first modulation constellation information. The first signature matrix information is used to indicate a first signature matrix, the first signature sequence information is used to indicate the first signature sequence in the first signature matrix, and the first modulation constellation information is used to indicate the first modulation constellation.

That the processor 910 determines the first signature sequence and the first modulation constellation according to the indication information includes:

determining the first signature sequence in the first signature matrix and the first modulation constellation according to the first signature matrix information, the first signature sequence information, and the first modulation constellation information, where each signature matrix includes two or more signature sequences.

Optionally, in an embodiment, the indication information received by the receiver 940 includes second signature sequence information and first modulation constellation information. The second signature sequence information is used to indicate the first signature sequence, and the first modulation constellation information is used to indicate the first modulation constellation.

That the processor 910 determines the first signature sequence and the first modulation constellation according to the indication information includes:

determining the first signature sequence and the first modulation constellation according to the second signature sequence information and the first modulation constellation information.

Optionally, in an embodiment, the first modulation constellation information determined by the processor 910 includes modulation order information of the first modulation constellation.

Optionally, in an embodiment, that the receiver 940 receives the indication information transmitted by the network device includes:

receiving, from the network device, an uplink scheduling grant message, dedicated higher-layer control signaling, or a system broadcast message, where the uplink scheduling grant message, the dedicated higher-layer control signaling, and the system broadcast message include the indication information.

Optionally, in an embodiment, the dedicated higher-layer control signaling includes a radio resource control RRC connection setup message and an RRC connection reconfiguration message.

Optionally, in an embodiment, the indication information received by the receiver 940 is bit string information.

Optionally, in an embodiment, the signature sequence is a low-density signature LDS sequence.

Optionally, in an embodiment, a quantity of zero elements included in the signature sequence is greater than or equal to a quantity of non-zero elements.

Optionally, in an embodiment, the apparatus 900 is a terminal device.

It should be understood that the indication information transmission apparatus 900 in this embodiment of the present disclosure may be corresponding to the terminal device and the apparatus 600 in this embodiment of the present disclosure, and may be corresponding to a corresponding body for executing the method of the embodiments of the present disclosure. In addition, the foregoing and other operations and/or functions of the modules in the apparatus 900 are separately intended to implement corresponding processes of the methods in FIG. 5 to FIG. 7. For brevity, details are not described herein again.

Therefore, according to the indication information transmission apparatus in this embodiment of the present disclosure, a terminal device receives indication information transmitted by a network device, where the indication information is used to indicate a first signature sequence and a first modulation constellation that are used to transmit an uplink data stream, and uses the first signature sequence and the first modulation constellation to transmit the uplink data stream, so that the terminal device and the network device can use the first signature sequence and the first modulation constellation to perform data transmission. This can effectively increase a system network capacity, including increasing a quantity of accessible users of a system, spectral efficiency, and the like.

In addition, the apparatus in this embodiment of the present disclosure can receive a signature matrix and a modulation constellation that are used to transmit an uplink data stream and that are indicated by the network device by using less information. Therefore, the apparatus can effectively increase a system network capacity, and can further reduce system overheads.

It should be understood that the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should be further understood that determining B according to A does not mean that B is determined according to A only; that is, B may also be determined according to A and/or other information.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or another network such as the Internet interacting with other systems by using the signal).

In addition, aspects or features of the present disclosure may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk), a DVD (Digital Versatile Disk), a smart card and a flash memory component (for example, EPROM (Erasable Programmable Read-Only Memory)), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, or may be implemented in electronic, mechanical, or other forms.

The units described as separate parts may or may not be physically separate. Parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The descriptions described above are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An indication information transmission apparatus, comprising:
a processor, a memory, a bus system, and a transmitter, wherein the processor, the memory, and the transmitter are connected by using the bus system, the memory is configured to store instructions, and the processor is configured to execute the instructions stored in the memory, to control the transmitter to transmit a signal;
wherein the processor is configured to:
determine a first signature sequence and a first modulation constellation that are used to transmit an uplink data stream by a terminal device, wherein each signature sequence is a multi-dimensional complex-number vector comprising at least one zero element and at least one non-zero element, and the first signature sequence is used to perform amplitude and phase adjustment on a modulation symbol obtained after the terminal device performs constellation mapping on the uplink data stream by using a modulation constellation, and
determine indication information that is used to indicate the first signature sequence and the first modulation constellation; and
wherein the transmitter is configured to transmit the indication information to the terminal device.

2. The apparatus according to claim 1, wherein the processor is further configured to:
determine that the first signature sequence belongs to a first signature matrix, wherein each signature matrix comprises two or more signature sequences; and
determine that the indication information comprises first signature matrix information, first signature sequence information, and first modulation constellation information, wherein the first signature matrix information is used to indicate the first signature matrix, the first signature sequence information is used to indicate the first signature sequence in the first signature matrix, and the first modulation constellation information is used to indicate the first modulation constellation.

3. The apparatus according to claim 1, wherein the processor is further configured to:
determine that the indication information comprises second signature sequence information and first modulation constellation information, wherein the second signature sequence information is used to indicate a second signature sequence, and the first modulation constellation information is used to indicate the first modulation constellation.

4. The apparatus according to claim 2, wherein the first modulation constellation information determined by the processor comprises modulation order information of the first modulation constellation.

5. The apparatus according to claim 1, wherein the transmitter is further configured to:
transmit an uplink scheduling grant message, dedicated higher-layer control signaling, or a system broadcast message to the terminal device, wherein the uplink scheduling grant message, the dedicated higher-layer control signaling, and the system broadcast message comprise the indication information.

6. The apparatus according to claim 5, wherein the dedicated higher-layer control signaling comprises a radio resource control (RRC) connection setup message and an RRC connection reconfiguration message.

7. The apparatus according to claim 1, wherein the indication information determined by the processor is bit string information.

8. The apparatus according to claim 3, wherein the first signature sequence or the second signature sequence is a low-density signature (LDS) sequence.

9. The apparatus according to claim 8, wherein a quantity of zero elements comprised in the first signature sequence or the second signature sequence is greater than or equal to a quantity of non-zero elements.

10. The apparatus according to claim 1, wherein the apparatus is a network device.

11. An indication information transmission apparatus, comprising:
a processor, a memory, a bus system, a receiver, and a transmitter, wherein the processor, the memory, the receiver, and the transmitter are connected by using the bus system, the memory is configured to store an instruction, and the processor is configured to execute the instruction stored in the memory, to control the receiver to receive a signal and to control the transmitter to transmit a signal;
wherein the receiver is configured to:
receive indication information transmitted by a network device, wherein the indication information is used to indicate a first signature sequence and a first modulation constellation that are used to transmit an uplink data stream, each signature sequence is a multi-dimensional complex-number vector comprising at least one zero element and at least one non-zero element, and the first signature sequence is used to perform amplitude and phase adjustment on a modulation symbol obtained after a terminal device performs constellation mapping on the uplink data stream by using a modulation constellation;
wherein the processor is configured to:
determine the first signature sequence and the first modulation constellation according to the indication information; and
wherein the transmitter is configured to:
transmit the uplink data stream according to the first signature sequence and the first modulation constellation.

12. The apparatus according to claim 11, wherein:
the indication information received by the receiver comprises first signature matrix information, first signature sequence information, and first modulation constellation information, wherein the first signature matrix information is used to indicate a first signature matrix, the first signature sequence information is used to indicate the first signature sequence in the first signature matrix, and the first modulation constellation information is used to indicate the first modulation constellation; and the processor is further configured to:
determine the first signature sequence in the first signature matrix and the first modulation constellation according to the first signature matrix information, the first signature sequence information, and the first modulation constellation information, wherein each signature matrix comprises two or more signature sequences.

13. The apparatus according to claim 11, wherein:
the indication information received by the receiver comprises second signature sequence information and first modulation constellation information, wherein the second signature sequence information is used to indicate the first signature sequence, and the first modulation constellation information is used to indicate the first modulation constellation; and
the processor is further configured to:
determine the first signature sequence and the first modulation constellation according to the second signature sequence information and the first modulation constellation information.

14. The apparatus according to claim 12, wherein the first modulation constellation information determined by the processor comprises modulation order information of the first modulation constellation.

15. The apparatus according to claim 11, wherein the receiver is further configured to:
receive, from the network device, an uplink scheduling grant message, dedicated higher-layer control signaling, or a system broadcast message, wherein the uplink scheduling grant message, the dedicated higher-layer control signaling, and the system broadcast message comprise the indication information.

16. The apparatus according to claim 15, wherein the dedicated higher-layer control signaling comprises a radio resource control (RRC) connection setup message and an RRC connection reconfiguration message.

17. The apparatus according to claim 11, wherein the indication information received by the receiver is bit string information.

18. The apparatus according to claim 11, wherein the first signature sequence is a low-density signature (LDS) sequence.

19. The apparatus according to claim 18, wherein a quantity of zero elements comprised in the first signature sequence is greater than or equal to a quantity of non-zero elements.

20. The apparatus according to claim 11, wherein the apparatus is a terminal device.

* * * * *